United States Patent
Stout et al.

(10) Patent No.: US 8,285,830 B1
(45) Date of Patent: *Oct. 9, 2012

(54) SYSTEM AND METHOD FOR COMBATING CYBERSQUATTING

(75) Inventors: Brody Stout, Huntington Beach, CA (US); Keith McDowell, San Juan Capistrano, CA (US)

(73) Assignee: Citizenhawk, Inc., Aliso Viejo, CA (US)

( * ) Notice: Subject to any disclaimer, the term of this patent is extended or adjusted under 35 U.S.C. 154(b) by 87 days.

This patent is subject to a terminal disclaimer.

(21) Appl. No.: 12/683,378

(22) Filed: Jan. 6, 2010

Related U.S. Application Data

(60) Provisional application No. 61/142,851, filed on Jan. 6, 2009.

(51) Int. Cl.
G06F 15/173 (2006.01)
(52) U.S. Cl. .......... 709/223; 709/224; 709/203
(58) Field of Classification Search .......... 709/223, 709/224, 203
See application file for complete search history.

(56) References Cited

U.S. PATENT DOCUMENTS

| | | | | |
|---|---|---|---|---|
| 7,421,498 | B2 * | 9/2008 | Packer | 709/239 |
| 7,548,968 | B1 * | 6/2009 | Bura et al. | 709/223 |
| 7,756,987 | B2 | 7/2010 | Wang et al. | |
| 7,853,719 | B1 * | 12/2010 | Cao et al. | 709/203 |
| 2002/0091827 | A1 | 7/2002 | King et al. | |
| 2002/0099693 | A1 * | 7/2002 | Kofsky | 707/3 |
| 2004/0220903 | A1 * | 11/2004 | Shah et al. | 707/3 |
| 2006/0230380 | A1 * | 10/2006 | Holmes et al. | 717/117 |
| 2008/0033822 | A1 * | 2/2008 | Merdinger | 705/14 |
| 2008/0250159 | A1 * | 10/2008 | Wang et al. | 709/239 |
| 2010/0017218 | A1 * | 1/2010 | Gazetova et al. | 705/1 |
| 2010/0042622 | A1 * | 2/2010 | Matkowsky | 707/6 |

OTHER PUBLICATIONS

Archive of Citizen Hawk website, TypoSquasher Product Description, dated Dec. 21, 2007.
Description in accompanying cover letter of pre-critical date activities of Citizen Hawk, Inc., Aug. 24, 2012.
Agreement between CitizenHawk corporation and Lillian Vernon Corporation, dated Jul. 27, 2007.
List of UDRP filings for CitizenHawk corporation from www.udrpsearch.com, dated Aug. 23, 2012.
Complaint Transmittal Cover Sheet and Complaint from eLUXURY, Inc., Complainant, Nov. 26, 2007; 100 pages.
Complaint Transmittal Cover Sheet and Complaint from eLUXURY, Inc., Complainant, Jan. 4, 2008; 138 pages.
Complaint Transmittal Cover Sheet and Complaint from Gaiam, Inc., Complainant, Nov. 14, 2008; 123 pages.
Complaint Transmittal Cover Sheet and Complaint from Lillian Vernon Corp., Complainant, Jan. 10, 2008; 126 pages.
Complaint Transmittal Cover Sheet and Complaint from Lillian Vernon Corp., Complainant, Sep. 27, 2007; 72 pages.
Complaint Transmittal Cover Sheet and Complaint from Lillian Vernon Corp., Complainant, Jan. 28, 2008; 149 pages.
Complaint Transmittal Cover Sheet and Complaint from Lillian Vernon Corp., Complainant, Jan. 10, 2008; 125 pages.

(Continued)

*Primary Examiner* — Philip B Tran
(74) *Attorney, Agent, or Firm* — Knobbe, Martens, Olson & Bear LLP

(57) ABSTRACT

A computer-implemented method for combating cybersquatting is provided. The method may comprise receiving a trademark to be monitored for potential typosquatting and generating a list of one or more typo domains for the trademark. The method then collects data associated with the one or more typo domains and prepares a document that includes a subset of the domains with their associated collected data for submission to an administrative agency handling domain disputes.

18 Claims, 14 Drawing Sheets

OTHER PUBLICATIONS www.wipo.int/amc/en/domains/filing/udrp/complaint.html, May 26, 2008, as seen via the Way Back Machine.

www.networksolutions.com/build-it/forwarding.jsp, Apr. 21, 2008, as seen via the Way Back Machine.

Past, present, and future office actions, amendments, arguments, and other relevant documents or materials in the file history of co-pending U.S. Appl. No. 12/683,389, filed Jan. 6, 2010, entitled System and Method for Combating Cybersquatting.

Wojciechowski, Y.: "Innovative Approach to Domain Name Strategy Delivers Significant Savings to Fortune 500 Company", www.fairwindspartners.com—Nov. 4, 2008.

"Delivering Improved Performance and Cost Savings to Global Businesses", www.fairwindspartners.com—Oct. 4, 2007.

Jesdanum, A.: "Software released to neutralize VeriSign typosquatting", The Associated Press—Sep. 16, 2003.

Ducklin, P.: "Typosquatting—what happens when you mistype a website name", http://nakedsecurity.sophos.com/typosquatting/—date, unknown.

Keats, S.: "What's in a Name: Yhe State of Typo-Squatting 2007", McAfee, Inc—Nov. 2007.

"Google Advances in Telephony, E-Books, YouTube", www.sramanamitra.com/2009/10/19/google-moves-forward-with-telephony-e-books-youtube—Oct. 19, 2009.

"Cyberlaw Update: Google sued for allowing typo-squatting", http://tcattorney.typepad.com/domainnamedisopute/2008/10/cyberlaw-update.html—Oct. 14, 2008.

"Ils Google Profiting From Typosquatting? Harvard Business Professor Sues Google for Mass Trademark Infringment", http://tcattorney.typepad.com/domainnamedisopute/2008/10/is-google-profi.html—Oct. 19, 2008.

"Typosquatting; The Business of Cybersquatting, Part 2 of 3", Fairwinds Partners Internet Strategy Consultants—2008.

* cited by examiner

Start a new UDRP

File  View

UDRP Generator

Factual and Legal Grounds for the UDRP

| | |
|---|---|
| *Does a disputed domain contain links a complainant's competitor: | ○ Yes ● No |
| *Does a disputed domain redirect to a competitor: | ○ Yes ● No |
| *Was the mark registered with the USPTO before all disputed domains were registered: | ● Yes ○ No |
| *Was the respondent's domain registered after the complainant's: | ● Yes ○ No |
| *Has the respondent ignored the complainant's attempts to resolve the dispute: | ● Yes ○ No |
| *Is a domain redirecting to the complainants site and profiting from it through an affiliate program | ○ Yes ● No |
| *Is the respondent a serial typo squatter: | ○ Yes ● No |
| *Does the respondent have other unrelated domains that are examples of typo squatting: | ● Yes ○ No |
| *Does the respondent have false or incomplete WHOIS information: | ● Yes ○ No |
| *Does the respondent have the complainants mark spelled correctly on some domains: | ● Yes ○ No |
| *Does the respondent have content and/or keywords related to the complainant for some domains: | ○ Yes ● No |
| *Which juristriction should govern disputes: | ● Registrar   ○ Respondent |

Page 9 of 18                              Previous  Next  Finish

FIG. 6

SYSTEM AND METHOD FOR COMBATING CYBERSQUATTING

CROSS REFERENCE TO RELATED APPLICATIONS

This application claims the benefit of U.S. provisional application No. 61/142,851, filed Jan. 6, 2009, the disclosure of which is hereby incorporated by reference in its entirety.

BACKGROUND

1. Field

The present disclosure relates to computer systems for combating cybersquatting.

2. Description of the Related Art

Various types of marketing programs and systems exist for driving traffic to websites. For example, Google and other entities operate various types of cost-per-click ("CPC") programs in which the advertiser pays a CPC fee when a user clicks on one of its ads. In some cases, the ads are displayed on the websites of third party "ad publishers" who participate in such programs in exchange for a portion of the CPC revenue.

Another type of marketing program is known as affiliate marketing. In an affiliate marketing program, website operators, referred to as "affiliates," drive traffic to e-commerce sites in exchange for being paid a fee when the referred user conducts a transaction. For example, if a user selects an advertisement or other link on an affiliate site to access the e-commerce site of a merchant, and then completes a purchase, the merchant may pay the affiliate a fee. These fees are commonly referred to as "cost-per-action" (CPA) or "pay-per-action" fees. The amount of the CPA fee may depend on the type of transaction conducted, the dollar amount involved, and/or other factors.

Some merchants operate their own affiliate marketing programs. In other cases, an intermediary, sometimes referred to as an affiliate network provider, is involved. The affiliate network provider may handle such tasks as signing up and managing relationships with affiliates, tracking referrals and resulting transactions, calculating and paying CPA fees, and (in some cases) dynamically serving advertisements for display on affiliate web pages. Regardless of whether an affiliate network provider is used, the referrals are typically tracked using unique affiliate identifiers that are assigned to the affiliates and encoded in the outgoing/paid links.

With the advance of online advertising, online trademark infringement has become a major issue for e-retailers, brand holders, and the online advertising industry in general. With up to 20% of all hand-typed URLs being misspelled, a large market has emerged for "typo" domain names that exploit and monetize accidental traffic at the brand holder's expense. This practice, known as cybersquatting or typosquatting, costs brand holders millions of dollars each year in lost revenues and affiliate fraud (false activity generated by an affiliate in an attempt to generate illegitimate revenue.)

Cybersquatters have traditionally made money in a variety of ways. For example, a cybersquatter may register a typo domain, and then offer it to the legitimate brand holder for a relatively high price. Some cybersquatters put up derogatory remarks about the person or company the domain is meant to represent in an effort to encourage the subject to buy the domain from them. Other cybersquatters monetize their efforts by posting paid (CPC or CPA) links from the typo domain site to one or more legitimate sites, typically via participation in an advertising or affiliate marketing program.

Companies that desire to gain control over a typosquatting domain generally have three options available to them. First, they can contact the registrant of the typosquatting domain and either demand that it be relinquished (e.g., through a cease-and-desist letter) or attempt to negotiate its purchase. When this option works, it is usually the least expensive approach. However, such communications are frequently ignored by the typo squatters.

Second, the companies can file a lawsuit, typically under the Anti-Cybersquatting Consumer Protection Act of 1999. This option is frequently the most expensive and also the slowest, but it has some advantages, particularly concerning foreign registrants and also concerning the possible award of monetary damages.

Finally, the companies can use the Uniform Domain Name Resolution Policy (UDRP) process developed by the Internet Corporation for Assigned Names and Numbers (ICANN). A UDRP complaint may initiate a UDRP proceeding with an approved dispute resolution service provider. Under UDRP policy, successful complainants can have the domains deleted or transferred to their ownership. This choice is fairly inexpensive, typically costing a few thousand dollars in filing fees and preparation. It is also relatively quick—usually lasting about two months. Finally, the UDRP has the advantage of being internationally binding.

All of these tools are appropriate to consider when dealing with a handful of infringing domains. However, when the quantity of typosquatting domains increases, the costs associated with combating typosquatting grow exponentially. For instance, suppose a company has 250 typosquatting domain names to deal with and that each UDRP costs $2,000. The company now has a $500,000 expense to justify. Further, the task of preparing such a large number of UDRP filings, including gathering evidence of fraudulent activity, can be daunting.

BRIEF DESCRIPTION OF THE DRAWINGS

The foregoing aspects and many of the attendant advantages of this disclosure will become more readily appreciated as the same become better understood by reference to the following detailed description, when taken in conjunction with the accompanying drawings, wherein:

FIG. 6 illustrates one example of a user interface of a software wizard for entering data during the analysis step of FIG. 3, in accordance with one embodiment of the invention.

DETAILED DESCRIPTION OF THE PREFERRED EMBODIMENTS

Embodiments of the invention will now be described with reference to the accompanying figures, wherein like numerals refer to like elements throughout. The terminology used in the description presented herein is not intended to be interpreted in any limited or restrictive manner, simply because it is being utilized in conjunction with a detailed description of certain specific embodiments of the invention. Furthermore, embodiments of the invention may include several novel features, no single one of which is solely responsible for its desirable attributes or which is essential to practicing the inventions herein described.

Systems, methods, and computer-readable media are disclosed that enable a customer to combat cybersquatting. More specifically, systems, methods, and computer readable media are disclosed that may recover cybersquatted domains for the customer and refer traffic from the recovered domains to the customer for a fee.

For example, in one embodiment, a method for combating cybersquatting is provided. The method comprises providing a webpage to a user for submitting a trademark to be monitored for potential typosquatting, receiving the submitted trademark, and generating a list of typo domains for the submitted trademark. The method then collects data associated with the typo domains and groups the typo domains based on predetermined criteria, wherein the predetermined criteria comprises at least one of (a) IP address associated with the typo domains and (b) affiliate ID associated with the typo domains. In addition, the method prepares a document that includes the grouped domains with their associated collected data.

FIGS. 1-11 illustrate various exemplary embodiments of the invention, wherein the cybersquatting activity includes typosquatting. One of ordinary skill in the art, however, will appreciate that embodiments of the invention may be implemented for other types of cybersquatting or trademark infringement.

Figure 1:
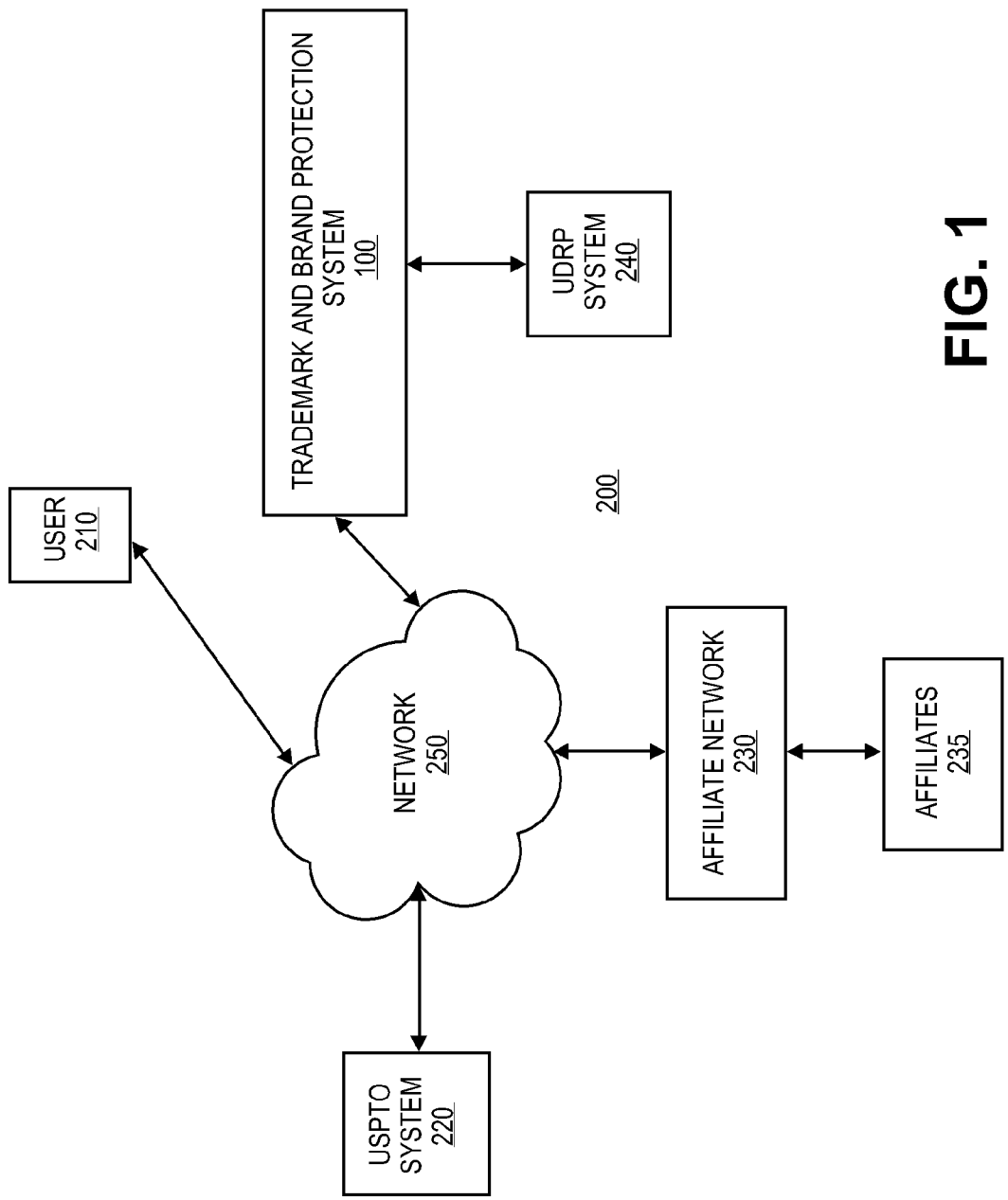
FIG. 1 is a block diagram of the system according to one embodiment.

FIG. 1 illustrates an exemplary system environment 200 for implementing embodiments of the invention. As shown in FIG. 1, system 200 may comprise multiple computer systems, such as a trademark and brand protection ("TMBP") system user 210 (implemented as a "client"), a USPTO system 220, affiliate network 230, affiliate sites 235, UDRP system 240, TMBP system user web site 250, and TMBP system 100 (implemented as a server system). These various components may be connected and communicate with one another through any suitable network 260, including the Internet. The affiliate sites 235, affiliate network 230, USPTO system 220, TMBP system user web site 250, and TMBP system user 210 may be conventional, preexisting systems operated by their respective entities.

The TMBP system user 210 may comprise any computing system used to perform tasks of some embodiments of the invention. In one embodiment, the TMBP system user 210 is maintained by a trademark holder involved in online advertising that is potentially a victim of cybersquatting and is a customer of TMBP system 100. TMBP system user 210 is provided a web interface such that a customer may interact with TMBP system 100. TMBP system user 210 may be located at any location, such as a customer's home, office, or kiosk, etc. Additionally, one skilled in the art will appreciate that any number of TMBP system users may be provided to enable access to system 100 by customers of an entity, such as an incorporated corporation for combating cybersquatting.

Moreover, TMBP system user 210 may have established click advertising payment programs ("pay-per-click") with affiliate network 230. Affiliate network 230 acts as an intermediary between affiliate sites 235 and (merchant) TMBP system user 210. It allows affiliates to find affiliate programs, which are suitable for their website and it helps websites offering affiliate programs reach its target audience. In one embodiment, the trademark holder associated with TMBP system user 210 agrees to pay each affiliate site for each user who clicks through from the affiliate site to TMBP system user web site 250. That is, if a user views a web page served from the affiliate site, and then clicks on a hypertext link (e.g., banner ad, logo, text, etc.) in that page to TMBP system user web site 250, then the associated trademark owner (via the affiliate network) owes the affiliate some predetermined amount of money. The trademark owner runs a click-through payment program in order to motivate affiliates to prominently display ads for the trademark owner on its web pages.

TMBP system 100 is maintained by an entity that combats cybersquatters on behalf of customers, such as the trademark holder associated with TMBP system user 210. In a preferred embodiment, TMBP system 100 is maintained by a trademark holders' representative that files UDRP actions against potential cybersquatters of the trademark holders.

USPTO system 220 is maintained by the United States Patent & Trademark Office. USPTO system 220 provides access to registered trademarks. UDRP system 240 is maintained by ICANN. UDRP system 240 accepts UDRP filings and TMBP system 100 submits UDRP filings to UDRP system 240.

Figure 2:
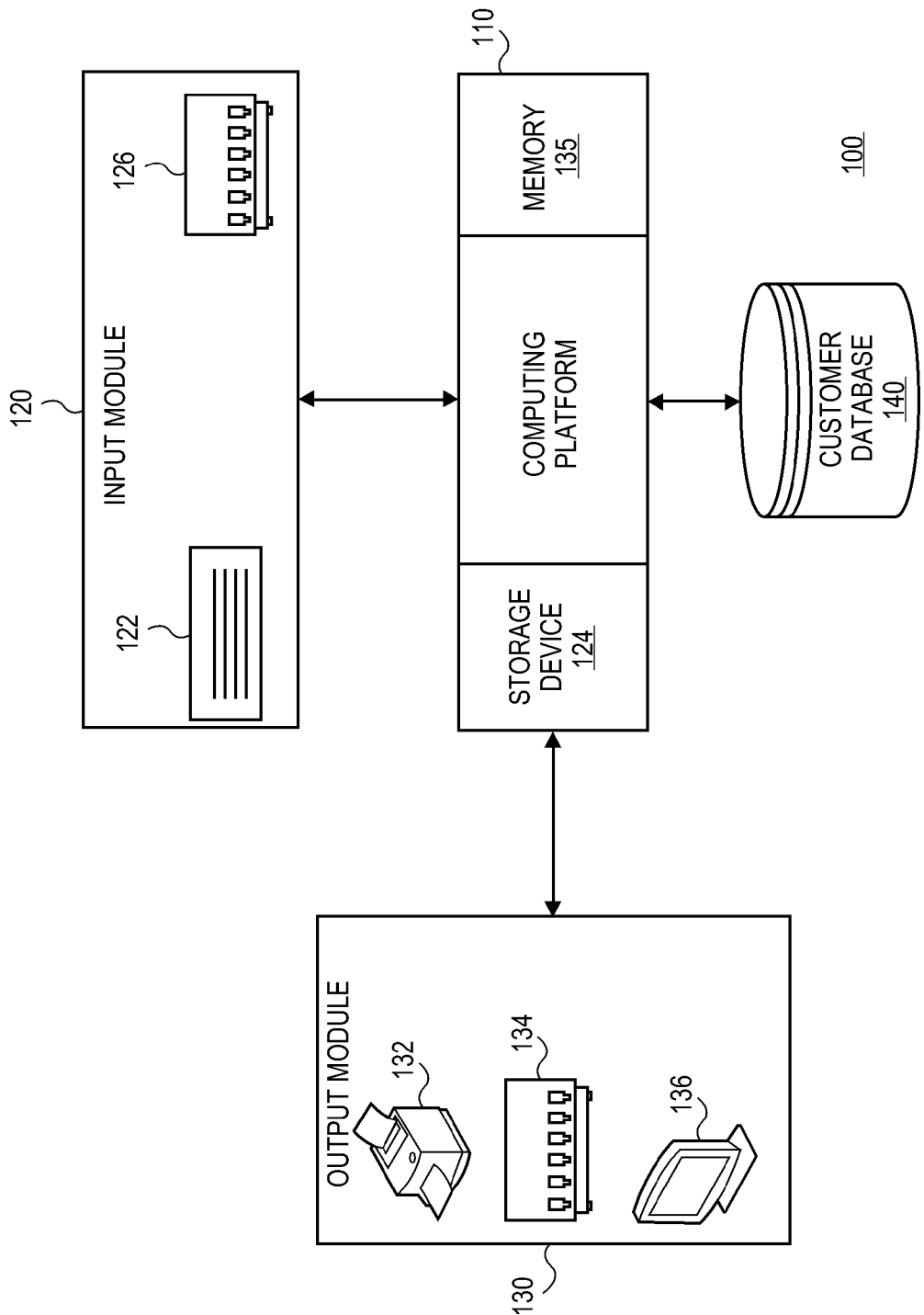
FIG. 2 illustrates the components of a system for combating cybersquatting, in accordance with one embodiment of the invention.

FIG. 2 illustrates a more detailed diagram of an exemplary TMBP system 100 according to one embodiment. In this example, TMBP system 100 facilitates the preparation and filing of UDRP actions on behalf of customers, such as victims of cybersquatting.

As illustrated in FIG. 2, TMBP system 100 includes a computing platform 110, an input module 120, an output module 130, a memory 135, and a customer database 140. Computing platform 110 may be adapted to process input information received from input module 120. Computing platform 110 may further be adapted to provide output information to output module 130. Additionally, computing platform 110 may access information in customer database 140 for use in performing methods of some embodiments of the present invention.

Computing platform 110 may comprise a general purpose computer (e.g., a personal computer, network computer, server, or mainframe computer) having a processor that may be selectively activated or reconfigured by a computer program to perform one or more methods of some embodiments of the present invention. Computing platform 110 may also be implemented as multiple computing devices in a distributed network.

Input module 120 may include an input device 122 and/or a network interface 126. Input device 122 may be implemented using a keyboard, mouse, speech recognition device, and/or data entering devices. Network interface 126 may receive information over any type of network (not shown), such as a telephony-based network (e.g., PBX or POTS), a local area network, a wide area network, a dedicated intranet, and/or the Internet. Computing platform 110 may also access data stored on storage device 124. Storage device 124 may include a memory, such as RAM or ROM memory that contains instructions or data for performing one or more methods of some embodiments of the present invention.

In preparation of a UDRP action, input module 120 may be used to enter or obtain a registered domain or trademark that may be a victim of cybersquatting (e.g., a URL), a list of potential cybersquatters or cybersquatted domains, characteristics of the potential cybersquatters, cybersquatted domains, or customer, registrant information associated with the potential cybersquatters, cybersquatted domains, or customer, screenshots of web sites associated with the potential cybersquatters or customer. Such information and requests may be obtained, for example, from an employee, from storage device 124, and/or from another computing system via network interface 126. Computing platform 110 may store such information received from input module 120 in customer database 140.

As further described below, computing platform 110 may use the stored customer information to provide reports to the customer and prepare and file a UDRP action on behalf of the customer. Computing platform 110 may then output the requested information via output module 130.

Output module 130 may include a printer 132, an output interface 134, and/or a display 136. Printer 132 may be used to provide a printout to interested parties of relevant information, such as a list of potential cybersquatters, reports associated with the potential cybersquatters, UDRP filing documents etc. Output interface 134 may be used to provide such relevant information and/or other information to the interested parties via the Internet, email, fax, page, etc. or save the information on a computer readable medium. Display 136 may be used to provide the list of cybersquatters, reports, and/or other information to interested parties visually.

Customer database 140 may include customer account data and customer domains data. Customer account data preferably includes a record of all personal data associated with customers, such as name, address, telephone number, driver's license number, social security number, credit card account number, checking account number, etc. Customer account data may also include the customer's membership identification ("ID") and password. Customer domains data preferably includes a record of all registered domains associated with the customers. Customer domains data may be determined from the customer or a registered domains service, such as the WhoIs service. Customer database 140 may also include record of all trademarks associated with the customers, record of all affiliate agreements associated with the customers, affidavits associated with the customers, cease and desist letters associated with the customers, domain registration agreements associated with the customers, records of all reports generated for the customers, and records of potential cybersquatters of the customers. The information to be stored in customer database 140 may be entered or obtained using input module 120.

Figure 3:
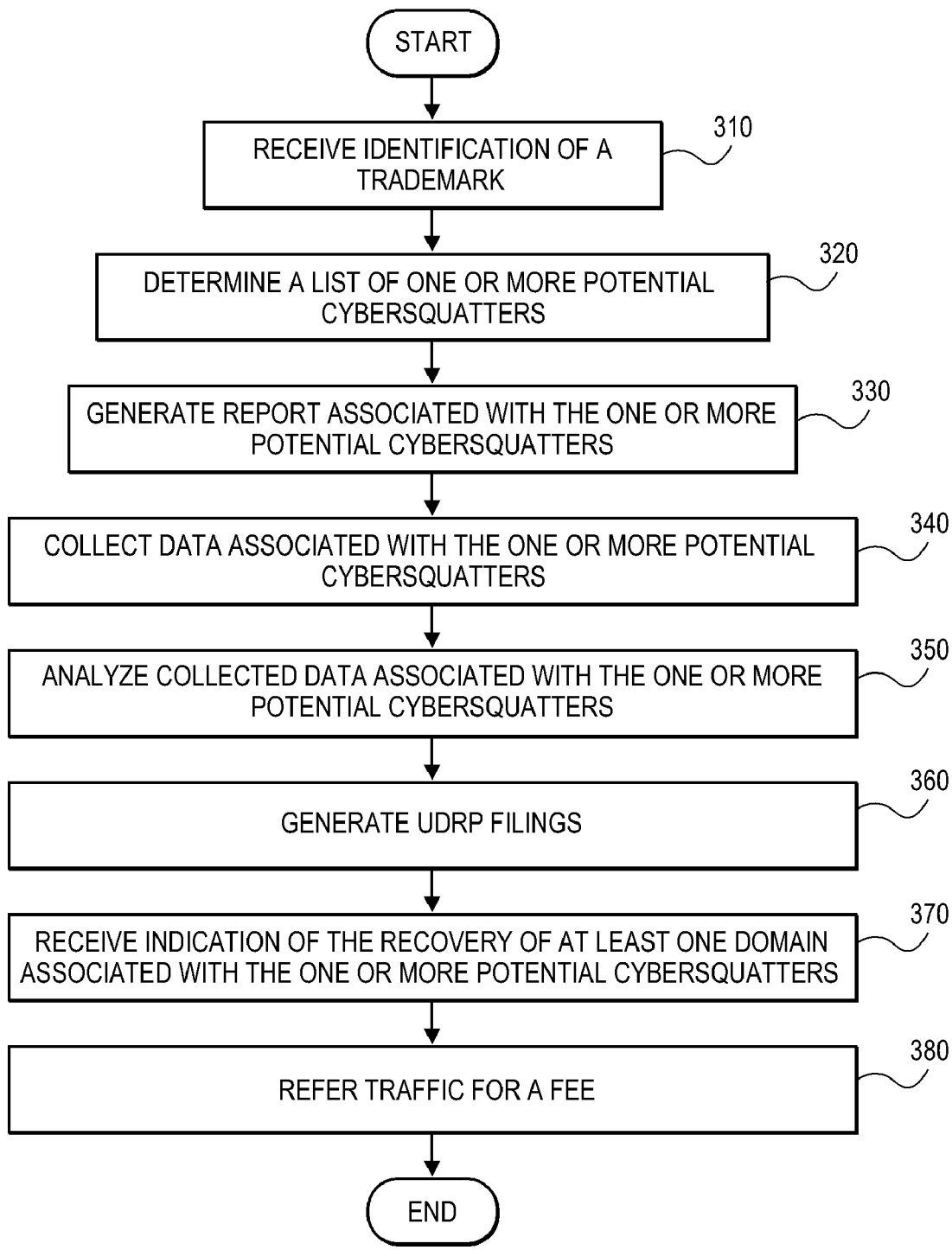
FIG. 3 illustrates a sequence of steps that may be performed by the trademark and brand protection system of FIG. 1, in accordance with one embodiment of the invention.

FIG. 3 illustrates a flowchart of an exemplary process for preparing a UDRP filing document of some embodiments of the present invention. This process may be performed automatically by TMBP system 100 by via execution of one or more code modules. Although the steps of the UDRP document preparation process are described as being performed in a particular order, one skilled in the art will appreciate that these steps may be performed in a modified or different order, or in an embodiment utilizing less than all of the steps described below. Further, one or more of the steps in FIG. 3 may be performed concurrently or in parallel.

First, computing platform 110 receives identification of a trademark that potentially is being cybersquatted (Step 310). The customer may specify the trademark or an identifier, such as a URL, registration number, etc., associated with the trademark using TMBP system user 210. A skilled artisan would appreciate that computing platform 110 may determine the identity of the trademark based on a submitted URL or registration number. For example, computing platform 110 can parse the URL to remove any extensions, and can use a database of registered trademarks for the determination. One example of such a database is CASSIS, which is a database supplied by the U.S. Patent and Trademark Office to determine the trademark based on the registration number. If the customer is not already registered, the customer may also register with the system at this point, and may be given a membership ID and/or password. Information supplied by the customer during and after registration is maintained in customer database 140.

In a preferred embodiment, the customer submits the trademark using a web page, and the request is transmitted to computing platform 110 over the Internet. The web page may be a dedicated web page for a trademark and brand protection program. Special log-ins may also be provided such that only members can submit requests. Furthermore, the customer may select which type of cybersquatting, such as typos, should be monitored. For instance, the customer may specify that one or more of the following types of typos should be monitored: inserted character, missing character, transposed characters, synonym, phonetic misspellings and other types known to one skilled in the art. Table 1 below lists some examples of possible typos that may be specified in embodiments of the present invention. In addition, the customer may select which top-level domains ("TLDs") should be searched. For example, the customer may specify that one or more of the following top level domains should be searched: .com, .biz, .net, .org, .us, etc. Moreover, the customer may also specify whether to include "combo-squat" results (i.e. a trademark name spelled correctly or incorrectly in combination with other keyword(s)). A skilled artisan will appreciate that the customer can input information regarding the trademark or other criteria using any known input mechanism provided by one or more web pages or other user interface, such as pull-down menus, text boxes, selection boxes, hyperlinks, and the like. A skilled artisan would also appreciate that in some embodiments of the present invention, customer may not be given an option to specify the other criteria, such as type of typos.

TABLE 1

| Type of Typos | |
| --- | --- |
| Type of Typo | Description |
| Missing Character | Class of typos in which a character is missing. Example: daredevl, daredevil |
| Double Character | Class of typos in which a character is repeated. Example: daaredevil, daredevil |
| Extra Hyphen | Class of typos in which an extra space is present. Example: dare-devil, daredev-il |
| Transposed Characters | Class of typos in which two characters are interchanged. Example: daerdevil, daredevil |

TABLE 1-continued

Type of Typos

| Type of Typo | Description |
| --- | --- |
| Wrong Key | Class of typos in which a character is replaced with one of its adjacent keys in a QWERTY keyboard.<br>Example: caredevil, datedevil. |
| Inserted Key | Class of typos in which an extra adjacent character is inserted before or after a character in the seed.<br>Example: sdaredevil, daredeviol, |
| Phonetic | Class of typos phonetically similar to the seed word.<br>Example: dairdevil |
| Lookalike | Class of typos that look like the seed word.<br>Example: For seed word "college": c0llege, co1lege, collge, col1ege, colleqe |
| Mirror Image character | Class of typos in which characters are replaced with their mirror images.<br>Example: baredevil, darebevil |
| Extra Vowel | Class of typos in which an extra vowel is inserted in seed.<br>Example: daredeevil, daredeviol |
| Dot Missing | Class of typos domain-name like affixes.<br>Example: wwwdaredevil, daredevilcom, |
| Homonym | Class of typos which have common root homonyms- ade, aide, aid; ail, ale, etc.<br>Example: embark, embarque |
| Partials | Class of typos in which one or more keywords are combined with the seed word. If the search pattern is anywhere in the string being searched, no matter what is before, after, or if it is alone, it is a match.<br>Example: shopdaredevil, daredevilnews |

Next, computing platform 110 determines a list of one or more potential cybersquatted domains for the submitted trademark, as discussed above (Step 320). As part of this step, computing platform 110 may crawl network 250 to locate typosquatted domains for the submitted trademark and other submitted criteria. Computing platform 110 can determine the typosquatted domains by first generating a list of potential typo domains by determining a list of "typos" for the trademark. For example, the list of potential typo domains could include domains that vary from the trademark in certain predetermined ways. For instance, the domain has flipped the letters of the trademark, the domain has added a letter to the trademark, the domain has juxtaposed two characters, or the domain has removed a letter from the trademark. A skilled artisan will appreciate that a variety of other differences could be checked for in embodiments of the present invention (i.e., Table 1 above). Then, computing platform 110 can use a registered domains service, such as the WhoIs service, to determine which of the typo domains in the list of typo domains had been registered. As another example, ".com" typo domains can be compared against a zone file database managed by VeriSign or other entity associated with domain name registrations. A zone file is a text file that describes a portion of the domain name system ("DNS") called a DNS zone. A zone contains information that defines mappings between domain names and IP addresses and other resources, organized in form of resource records ("RR"). The typo domains that had been registered could then be included in the list of one or more potential cybersquatters.

Figure 4:
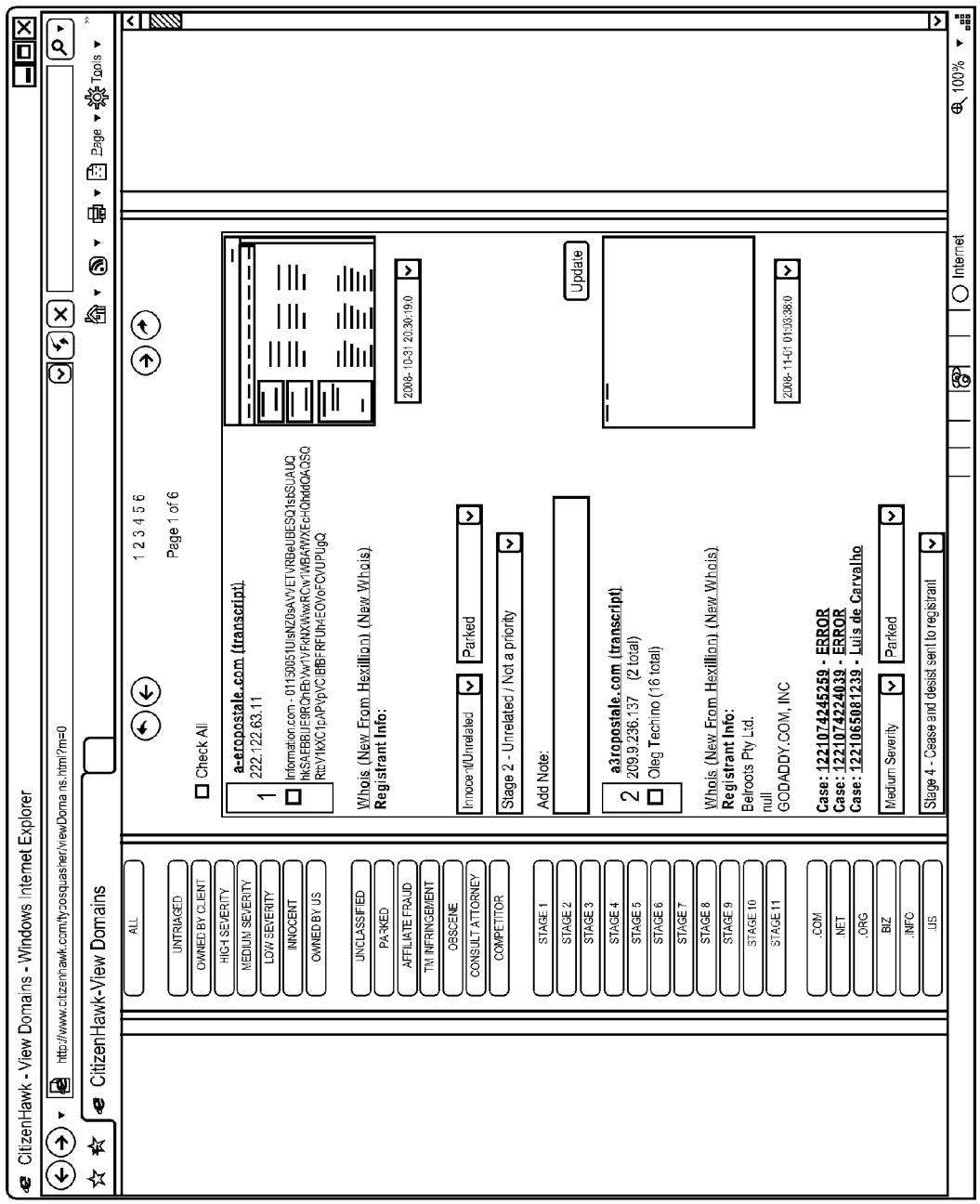
FIG. 4 illustrates one example of a type of cybersquatting report that may be generated, in accordance with one embodiment of the invention.

Computing platform 110 may then generate a report associated with the one or more potential cybersquatted domains (Step 330). As part of this step, computing platform 110 may prepare a report that lists the one or more potential cybersquatted domains and the level of threat they pose. The report could also include descriptions on the level of threat, type of monetizing activity, etc. as desired. FIG. 4 shows an exemplarity report according to one embodiment. In FIG. 4, two potential cybersquatted domains (a-eropostale and a3ropostale) for the trademark aeropostale are shown. Additional cybersquatted domains can be viewed by scrolling through the report. As shown in FIG. 4, the left column includes various filters that can be selected to generate a filtered view of the report. For example, the level of threat (owned by client, high, medium, low, innocent, etc.) associated with the one or more potential cybersquatted domains can be selected. For instance, the a-eopostale domain in FIG. 4, having a threat level of innocent/unrelated, would be shown if the innocent filtered view was chosen. As another example, as also shown in the left column, the description on the type of monetizing activity can also be selected. As another example, as also shown in the left column of FIG. 4, the stage of the handling of the potential cybersquatted domains can also be selected. One skilled in the art will appreciate that a variety of other information or filters can be shown in embodiments of the present invention. Further, a skilled artisan would appreciate that reports can be generated at a later time, for example, after the subsequent steps discussed below in embodiments of the present invention. Moreover, a skilled artisan will appreciate that a variety of other reports could be generated in embodiments of the present invention. After generating the reports, the reports can be given to TMBP system user 210 via output module 130.

Further, computing platform 110 may send an alert to TMBP system user 210 based on the one or more potential cybersquatted domains. For example, if computing platform 110 determines that a potential cybersquatted domain poses a high risk, computing platform 110 may send the customer an alert detailing the high risk potential cybersquatted domain. As another example, if computing platform 110 determines that a domain associated with a potential cybersquatter has been recovered (discussed below), the computing platform 110 can send an alert to the customer regarding the recovery. A skilled artisan will appreciate that a variety of alerts can be generated and sent in embodiments of the present invention.

Figure 8:
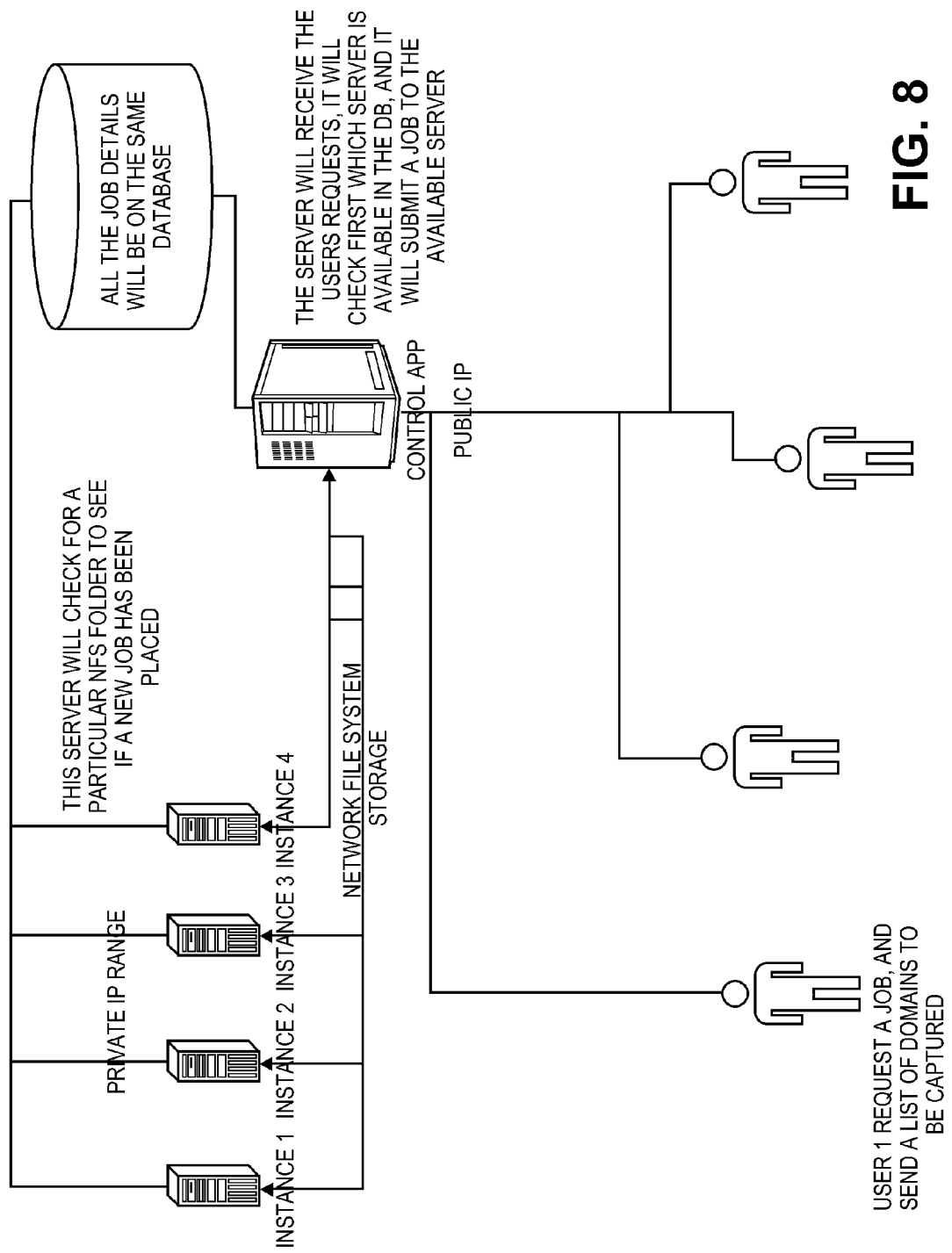
FIG. 8 shows one example of a system configuration, in accordance with one embodiment of the invention.

Computing platform 110 may then collect data associated with the one or more potential cybersquatted domains (Step 340). As part of this step, computing platform 110 may collect screenshots (including the browser's URL bar) of the one or more potential cybersquatted domains. Computing platform 110 may collect the screenshots by using a WebCrawler. For example, computing platform 110 may use Websnapr (www.websnapr.com), which can capture screenshots of almost any web page. Computing platform 110 may also collect registration status, creation and expiration date, DNS hosts and/or registrant information associated with the domains. For example, computing platform 110 may use the WhoIs service to locate the registrant information of the one or more potential cybersquatted domains. Moreover, computing platform 110 may also collect the IP address associated with the one or more potential cybersquatted domains. For instance, computing platform 110, may use the RegistryFusion™ available from Hexillion Technologies to determine the IP address based upon the URL associated with the potential cybersquatted domains. In addition, computing platform 110 may also collect traffic data associated with the one or more potential cybersquatted domains. For example, computing platform 110 may use APIs provided by Compete, Inc. and/or Alexa Internet, Inc. to collect relevant traffic ranking and visitor traffic metrics associated with the one or more potential cybersquatted domains. A skilled artisan would appreciate that the services used (e.g. WhoIs, Hexillion, etc). may in certain circumstances limit the number of times its services can be used by a certain IP address. For example, the WhoIs service may limit computing platform 110 to a predetermined number of uses based on its IP address. To overcome this, multiple computing devices having different IP address could be used. As an alternative, computing platform 110 may be configured to include multiple proxies (e.g., a single computing device with multiple virtual machines/IP addresses). FIG. 8 shows one example of this type of configuration. A skilled artisan would appreciate that a variety of other alternatives could be used.

Figure 9:
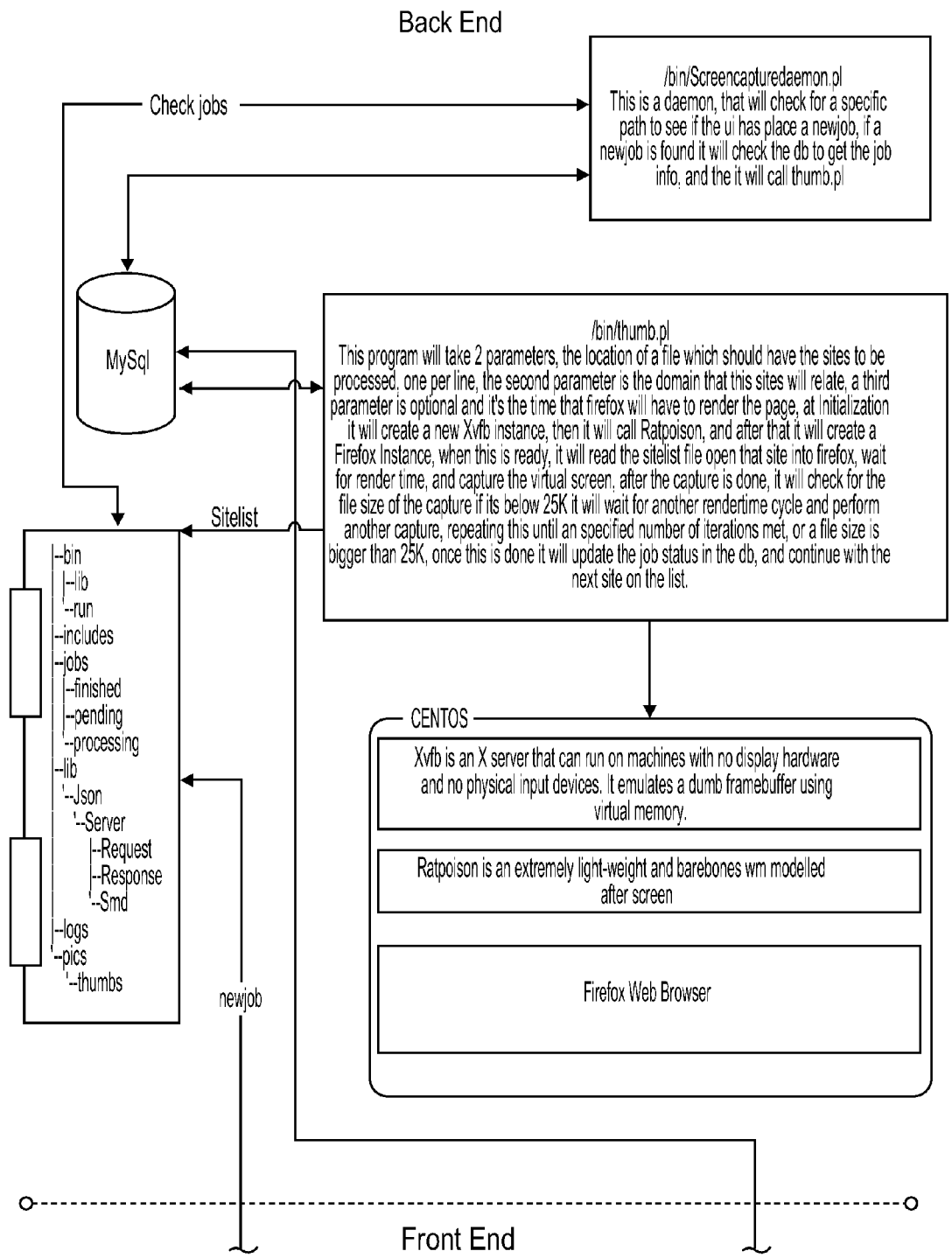
FIG. 9 shows one example of a software architecture, in accordance with one embodiment of the invention.
Figure 9:
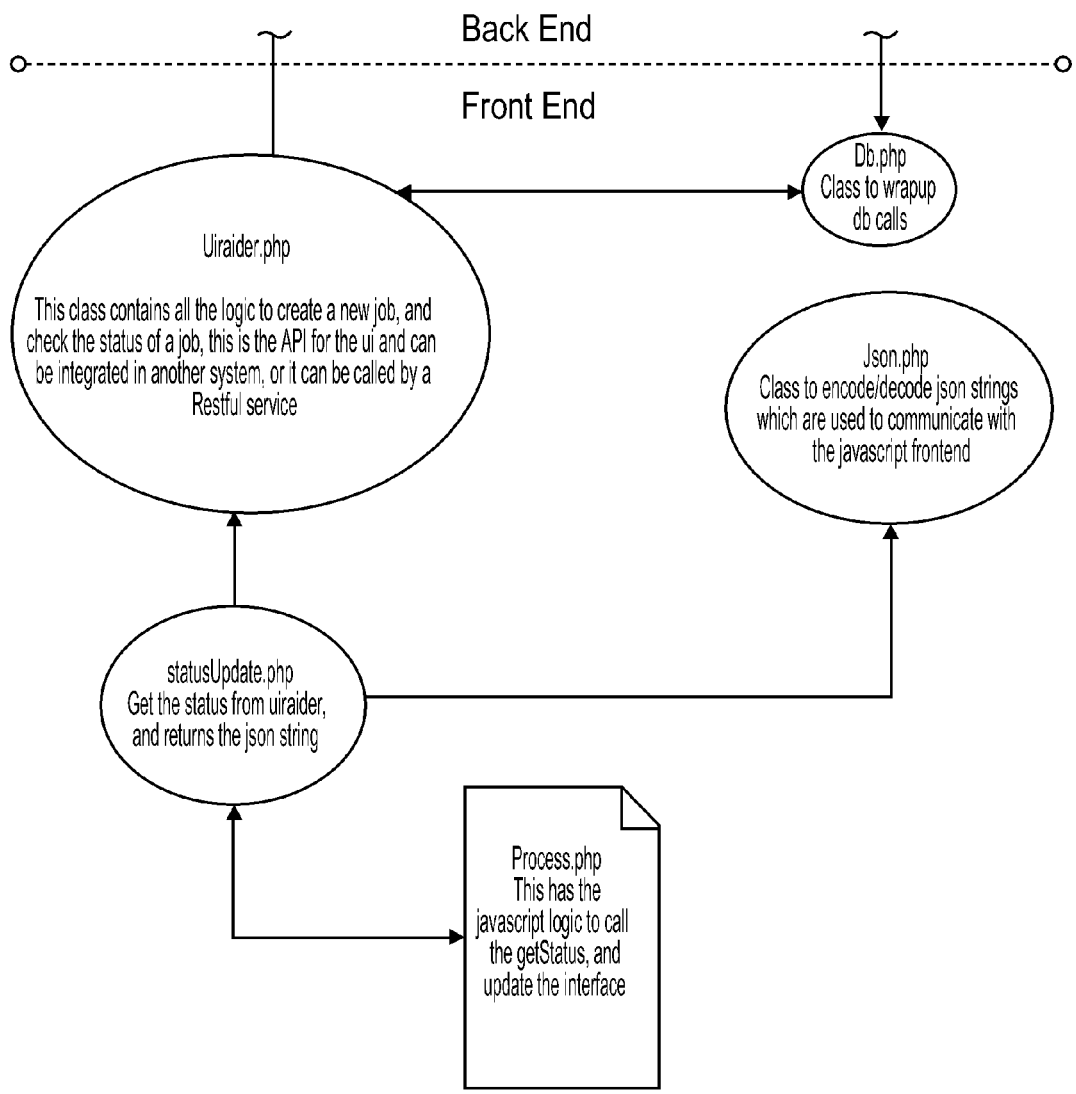

FIG. 9 shows one example of a dynamic object-oriented software architecture that could be used by computing platform 110 to implement the functionality discussed for the collection of data associated with the one or more potential cybersquatted domains. A skilled artisan would appreciate that many other architectures could also be used in embodiments of the present invention.

In addition, computing platform 110 may determine the monetization ID, such as an affiliate ID, of the one or more potential cybersquatted domains. For example, computing platform 110 may select a link on the web site of the one or more potential cybersquatted domains. This enables computing platform 110 to determine the affiliate ID of the one or more potential cybersquatters. Moreover, to prevent an intermediate entity from changing the affiliate link before arriving at TMBP system user web site 250, computing platform 110 may also continuously hit links from web site to web site before arriving at the target system, such as TMBP system user web site 250. Computing platform 110 can then record the affiliate links along the way to TMBP system user web site 250. Alternatively, during the process in which screenshots are captured, a web crawler can also be employed to recover transcript or hyper link data. The web crawlers can be used to gather specific types of information from the web pages visited (transparent or non-transparent to and end-user), when a user types in a URL. For instance, computing platform 110 can provide a list of the one or more potential cybersquatted domains to the web crawler. As the crawler visits these domains, it identifies all the hyperlinks embedded in the domain until a final target page for the domain is established. The hyperlinks embedded in the domain can be defined as the multiple "hops", or HTTP requests, that are rendered before ultimately arriving at the destination page. The "hops" are catalogued into a system registry where the full detail record, or "transcript", may be used by computing platform 110 to determine the affiliate ID of the one or more potential cybersquatted domains. Computing platform 110 may then store the registrant, screenshots, IP address, and affiliate ID data in customer database 140. A skilled artisan would appreciate that a variety of other monetization IDs could be determined in embodiments of the present invention.

Figure 5:
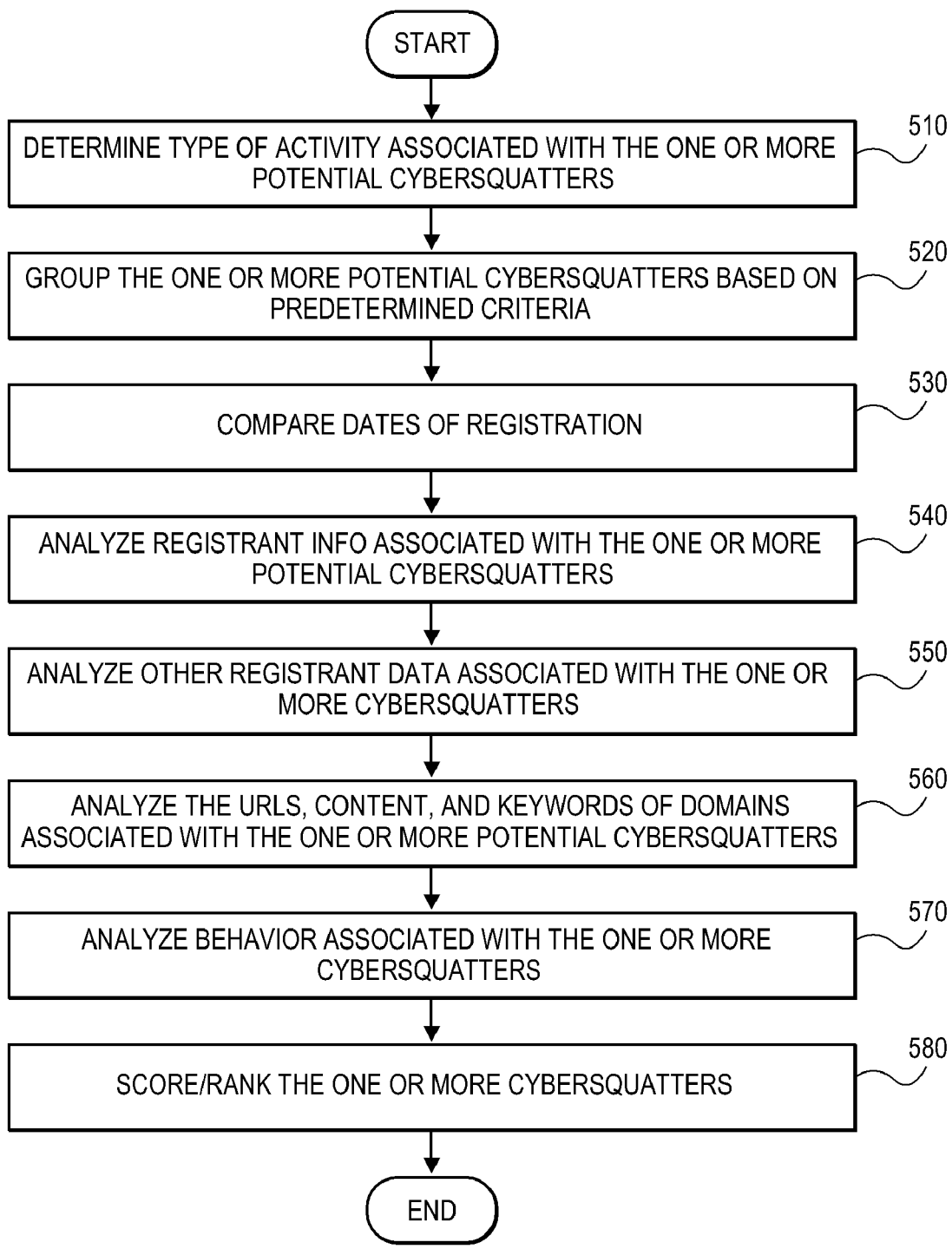
FIG. 5 illustrates a more detailed sequence of steps that may be performed by the trademark and brand protection system during the analysis step of FIG. 3, in accordance with one embodiment of the invention.

Subsequently, computing platform 110 may analyze the collected data associated with the potential cybersquatted domains (Step 350). FIG. 5 illustrates a flowchart of an exemplary process for analyzing the collected data in some embodiments of the present invention. Although the steps of the analyzing the collected data process are described as being performed in a particular order, one skilled in the art will appreciate that these steps may be performed in a modified or different order, or in an embodiment utilizing less than all of the steps described below. Further, one or more of the steps in FIG. 5 may be performed concurrently or in parallel. Moreover, one or more of the steps in FIG. 5 may be performed manually by the customer or their representative and the results inputted into TMBP system 100 using, for example, a software wizard, webpage interface, pull-down menus, etc.

First, computing platform 110 determines the type of activity associated with the one or more potential cybersquatted domains (Step 510). As discussed above, cybersquatters can generate revenue by (1) offering the "typo" domain to the brand holder at a price that is far greater than that at which they purchased it; (2) posting paid links on a website set up at the typo domain to generate CPC fees; or (3) forwarding the traffic arriving at the typo domain to an affiliate network link approved of by the trademark owner/customer as a means to generate CPC or CPA fees. Computing platform 110 determines which of the revenue-generating activities the one or more potential cybersquatted domains is conducting, if any. For example, computing platform 110 may analyze the content of the web site associated a potential cybersquatted domain to determine if any derogatory remarks about the customer have been put on the web site. Computing platform 110 can search through the web site for the customer's trademark or company name and analyze remarks and descriptions associated with the name.

Computing platform 110 may also determine whether the one or more potential cybersquatted domains are monetizing their squatting via paid links. For example, by analyzing page content of a typo domain site, computing platform 110 can determine whether the site displays advertisements that point to other domains. Computing platform 110 may also determine whether such advertisements lead to the customer's website or to a competitor of the customer. Further, computing platform 110 can also analyze any affiliate agreements associated with the customer to determine if any of the potential cybersquatted domains are an affiliate (within an affiliate marketing program) of the customer. That is, computing platform 110 can assess, for each potential cybersquatted domain, whether the registered owner of the domain is generating revenue from the customer. A skilled artisan would appreciate that determining the type of activity associated with the one or more potential cybersquatted domains may be done manually in some embodiments. In that case, the results or findings may be entered into TMBP system 100 using input module 120. For example, as shown in FIG. 6, the results or findings may be entered via a software wizard in one embodiment of the present invention. A skilled artisan will appreciate that the input information regarding the determined activity can be entered using any known input mechanism, such as web pages, voice input, scanning, and the like.

Next, computing platform 110 may determine, based on predetermined criteria, whether any of the potential cybersquatted domains can be grouped together for purposes of a UDRP filing (Step 520). As mentioned above, the costs of filing UDRP actions against multiple cybersquatters can be high. This cost can sometimes be reduced by identifying the domains that are owned by the same cybersquatter, and by generating a single UDRP filing for this group of domains. For example, computing platform 110 may determine if any of the cybersquatted domains have the same IP address. If two or more potential cybersquatted domains have the same IP address, computing platform 110 may group these domains into one or more UDRP filings even though they may have different registrant information. (Cybersquatters sometimes register multiple domains with different registrant information in an effort to evade detection; thus registration information alone is often insufficient for assessing whether two or more of the domains are co-owned)

As another example, computing platform 110 may analyze the affiliate IDs associated with the potential cybersquatted domains if they participate in affiliate programs. If two or more potential cybersquatted domains have the same affiliate ID, computing platform 110 may group these cybersquatted domains into a single UDRP filings even though they may have different registrant information.

As another example, the transcript, as discussed above, can be parsed such that unique identifiers relating the owner/monetizer of the one or more potential cybersquatted domains can be extracted/determined. Since affiliate networks and CPC parking companies may employ certain schemas to track payment or ownership of a particular URL, computing platform 110 can be configured to identify these common schemas, extract the affiliate ID information, and group together single owners of multiple domains/URLs using this unique ID.

In another embodiment, the one or more potential cybersquatted domains may be grouped into multiple UDRP filings based on similar criteria as discussed above. For example, 250 potential cybersquatted domains may be grouped into 10 UDRP filings. Computing platform 110 may group the potential cybersquatted domains, for instance, based on IP addresses associated with the one or more potential cybersquatted domains. As another example, computing platform 110 may decide to group potential cybersquatted domains with the same IP address into multiple UDRP filings based, for example, on the potential cybersquatted domain's method of revenue generation. A skilled artisan would also appreciate that different criterion for forming the groupings of domains may be used in embodiments of the present invention. For example, the addresses of the registrants, the names of the registrants, dates associated with the domain registrations, etc. can be used, in addition to or in place of the criteria mentioned above. Further, multiple criteria can be used in combination to generate a score representing the likelihood that two or more domains are effectively registered or monetized by the same entity.

Next, computing platform 110 compares the dates associated with the one or more potential cybersquatted domains with the dates associated with the customer (Step 530). For example, computing platform 110 compares the dates of registration of the one or more potential cybersquatted domains to the date of registration of the trademark of the customer. Domains that have been registered after the registration of the trademark of the customer are more likely to be potential cybersquatted domains. As another example, computing platform 110 may compare the date of registration for the potential cybersquatted domains versus the date of registration of domains associated with the customer. Domains that have been registered after the registration of domains of the customer are more likely to be potential cybersquatted domains. A skilled artisan would appreciate that many other comparisons are possible in embodiments of the present invention. For instance, the registration dates of the potential cybersquatted domains can be compared to the release or announcement date(s) of the customer's associated product(s) or service(s).

Subsequently, computing platform 110 retrieves and analyzes registrant data associated with the one or more potential cybersquatted domains (Step 540). Computing platform 110 may analyze registrant data associated with the one or more potential cybersquatted domains, for example, by reviewing the WhoIs data, to check if the registrant data is valid. For example, computing platform 110 may verify that the mailing address included in the domain registration information is valid. Domains having invalid addresses are more likely to be found as potential cybersquatted domains. Computing platform 110 may verify addresses by using commercial databases that provide such functionality, such as, the USPS Data Point Validation database. In another embodiment, computing platform 110 may analyze the registrant data associated with the one or more potential cybersquatted domains to determine if the data is complete. For example, computing platform 110 may review the WhoIs data to determine the number of fields that have not been completed. Incomplete data may be suggestive of potential cybersquatted domains. A skilled artisan would appreciate that other fields, such as, email address, telephone number, and the like, can be analyzed in embodiments of the present invention.

Computing platform 110 then analyzes other registrant data associated with the one or more potential cybersquatted domains (Step 550) to determine if there are any common patterns between specific domains. If any patterns are found, computing platform 110 may group the cybersquatted domains having a common pattern into one or multiple UDRP actions, as discussed above. For example, computing platform 110 may determine that some of the cybersquatted domains have similar registrant name and address information but just vary in their order (i.e., a random sequence of common characters), have similar registrant first names but different last names or vice versa, or have a few different characters. As another example, computing platform 110 may determine that some of the domains were registered around the same time (e.g., within a few minutes, hours, etc.) of each other. Domains registered at about the same time are more likely to be maintained by a single entity, and computing platform 110 may group them into a common UDRP filing on this basis.

Next, computing platform 110 analyzes the URLs, content, and keywords of the domains associated with the one or more potential cybersquatted domains (Step 560). Computing platform 110 can analyze this information to check if the domains include any reference to the customer, customer's company, customer's products or services, or customer's trademark. For example, computing platform 110 may analyze one or more pages at the URL(s) associated with a particular potential cybersquatted domain to determine if there is a reference to the customer. For instance, computing platform 110 may check one or more pages at "www.ahutterfly.com," which is a typo domain of the trademark "shutterfly." If, for example, the URL "www.ahutterfly.com/shutterfly" is found, the typo domain may be a potential cybersquatted domain because it shows awareness of the customer's trademark and knowledge of the correct spelling of customer's trademark. Computing platform 110 may crawl each identified domain, and analyze its keywords and content, to make this assessment.

In Step 570, computing platform 110 may analyze behavior associated with the one or more potential cybersquatters associated with the potential cybersquatted domains. For example, computing platform 110 may review all the domains associated with a particular potential cybersquatter to assess, for example, whether a particular cybersquatter is a serial typosquatter. For instance, if computing platform 110 determines that a particular potential cybersquatter has multiple domains that are typos of registered trademarks, the registrant is more likely a serial cybersquatter. Computing platform 110 can accomplish this by, for example, searching through the WhoIs database to locate all the domains associated with a particular potential cybersquatter based upon, for example, name, address, IP address, etc. Then, computing platform 110 may parse the domains to remove any extensions and compare the remaining portions to any registered trademarks by using a registered trademarks database. Subsequently, computing platform 110 can determine how many of the domains associated with a particular potential cybersquatter are typo domains. As another example, computing platform 110 may also analyze any public documents, decisions, or filings associated with a particular potential cybersquatter to determine if the potential cybersquatter has been accused or found guilty of cybersquatting previously. For instance, computing platform 110 may search through the National Arbitration Forum or WIPO UDRP decisions database to locate any decisions against the particular cybersquatter.

In Step 580, computing platform 110 may score and/or rank the one or more potential cybersquatted domains in terms of importance, threat, revenue, generated traffic, etc., or some combination of these criteria. This analysis enables the computing platform 110 to prioritize the potential cybersquatted domains in terms of which domains and entities should be targeted (or targeted first). Three methods for scoring and ranking the identified domains are described below. The computing platform 110 may employ one or more of these methods alone or in combination, in which case different (and variable) amounts of weight can be given to each method for purposes of generating an aggregate score 1) Traffic Ranking: Each domain targeted for recovery has the ability to be searched on Compete.com or Alexa, via an API provided by both of these services, as discussed above. Each potential cybersquatted domain can be searched against the Compete and/or Alexa databases to identify whether that targeted domain has recorded traffic at any time within a desired time period, such as the last 12-14 months. A detailed record of all registered traffic can be appended to the detail record for each of the one or more potential cybersquatted domains. Based on the results, a score for each domain is determined. For instance, from this list of values for the last 12-14 months, the last non-zero value may be extracted and can be used for the purposes of scoring. The extracted number can be compared against a table with range values and a designated number attached to each range. For example, a domain with 200 monthly visitors may be assigned a "1" (e.g. the range for a value of "1" would be 0-250 monthly hits; the range for a "2" ranking would be 251-700 monthly hits, and so on). The higher the ranking, on a scale of 5, the more attractive a domain becomes for recovery. This final ranking number can be used, alone and/or with one or both of the other methods listed below, to derive a final calculable value or score.

2) Typo Probability Matrix: Computing platform 100 may use a probability matrix that ranks the types of typos (see Table 1) based on their probability of occurrence. Then computing platform 110 can compare each of the one or more potential cybersquatted domains to the matrix and assign the domain a score based on its probability of occurrence as a typo of the customer's domain. For example, the probability matrix may identify the probability of one character being substituted for another in normal typewriting behavior (e.g. "wrong character" or "substitution" typos). The probability of various typos can be determined from various resources available to one skilled in the art (e.g., keyboard proximity, collected behavioral data, etc.). Additionally, one skilled in the art would appreciate that the probability matrix could be supplemented with results from case studies, surveys, customer feedback, etc. Much like the scoring system outlined above in the Traffic Ranking method, probabilities in the very high range are given a ranking of "5" out of five, while low probabilities typos are given a ranking "1". This final ranking number can be used, alone and/or with one or both of the other methods listed in this section, to derive a final calculable value or score.

3) Existing Customer data: Computing platform 110 can assign a score to each identified domain based on the domain's similarity to existing customer data including previously recovered domains. For instance, previously recovered domains can be monitored for information, such as total number of monthly clicks, conversions, revenue, commissions by domain, etc. This data can then harvested and segmented based upon the type of misspelling that is occurring (extra character, missing character, transposed character, phonetic misspellings, etc.) and further filtered by the incorrect spelling used. Based on this information, previously recovered domains can be given a score. For example, a high traffic/high revenue (and thus high commission) typo domain for an existing client may be travelosity.com (a typo on the primary domain travelocity.com). Travelosity.com could first be segmented into a "wrong character" misspelling and furthermore into a non-keyboard proximity ("s" and "c" are more than 1 character of in keyboard spacing) and phonetic misspelling characterization (replacing "c" with an "s"). Relative traffic and revenue contribution metrics for the single domain relative to the all domains recovered in aggregate can be used to determine a score of attractiveness for that particular domain. For example, if travelosity.com drives a disproportionately larger piece of the traffic/revenue for Travelocity.com account as a whole, travelosity.com could be given a score of "5" on a scale of 5.

The potential cybersquatted domains can now be compared to the existing customer data and calculated scores. For example, suppose the potential cybersquatted domains include sittercity.com or phoenixuniversity.edu. Computing platform 110 can scan whether there are like matches within its database of recovered domains based upon the type of misspelling occurring (phonetic misspelling, extra character, etc.) and assign a raking to the domain based upon the likely performance of that domain using past recovered domains as a gauge. In this case, sittersity.com, and phoenixunivercity.com (note the misspelling in each is similar to that in the Travelocity.com example), could be given a "5" ranking that would be used alone and/or with one or both of the methods listed above to derive a final calculable value or score.

Once a ranking or score is established for an individual domain using one or more of the above methods (where multiple ranking methods are used), a weighting for each ranking or score can be determined such that one ranking method may be given more weight than another. For example, depending upon how many of the scoring variables listed above are calculated for an individual domain, a weighting value may be assigned. For instance, the score for traffic ranking may receive the highest weighting, followed by the score for existing customer data, and then the score for the probability matrix. A skilled artisan would appreciate that in situations where scores could not be calculated for all the scoring methods, the weightings for the calculated scores could be adjusted. A skilled artisan would also appreciated that the weightings could be adjusted and calculated based on various factors. As an example, the weighting could be function of the reliability and strength of past traffic data, sample size of existing customer data, etc. The scoring mechanism described is one component of many could be used in the prioritization of which domains are targeted for recovery. Fixed weightings may alternatively be used. The ranking multiplied by the weighting is then calculated. Lastly, the sum of aforementioned products can be calculated to derive a final score for that particular domain targeted for recovery.

Returning to FIG. 3, computing platform 110 prepares the UDRP documents for filing (Step 360) for any domains and cybersquatters selected for targeting. A skilled artisan would appreciate that determining which domains and cybersquatters to target for active enforcement or domain recovery could be a function of many variables. For example, one or more of the following variables (either alone or in combination) could be considered:

(a) seasonality exhibited in revenue/commission payments of the customer/trademark experiencing the cybersquatting, (b) the contract term and/or monetization terms of the customer/trademark experiencing the cybersquatting, (c) the composition of the cybersquatters holding one or more of the cybersquatting domains, (d) past UDRP or federal/state judgments against a targeted cybersquatter, (e) past cooperation received from the cybersquatter, (f) the severity of the cybersquatting occurring on by the cybersquatter, (g) the potential revenue to be garnered from recovery of a targeted domain, (h) customer input, (i) behavioral characteristics of the cybersquatter, and (j) the scoring mechanism on a per-domain basis.

With regards to preparation of the UDRP document, computing platform 110 has collected and analyzed any data associated with these domains, and can now incorporate such data, along with customer data, into a UDRP document according to ICAAN, NAF, or WIPO's rules and procedures for filing: For instance, computing platform 110 can include the screenshots associated with the selected domains, WhoIs information associated with the customer or the selected domains, registered trademark information of the customer's trademark, references to one or more other typo domains held by the potential cybersquatters, and references to other domains or decisions associated with these cybersquatters. A skilled artisan would appreciate that the raw WhoIs information may be parsed to match the format required for the UDRP filing. Parsing can be performed by, for instance, extracting the relevant information from the varying fields and formats used by the independent registrars and populating the data into a common schema. In addition, computing platform 110 can enable a user to enter any additional information that may be needed for the UDRP filing. For example, computing platform 110 may provide a software wizard that enables a user to enter the customer or potential cybersquatters' name, customer or potential cybersquatters' number, customer or potential cybersquatters' representative, additional arguments, etc. Computing platform 110 may also enable a user to attach any documents that may be included along with the UDRP filings, such as, affiliate agreements, ICAAN rules, UDRP policies or rules, domain registration rules, Affidavits etc.

For example, the software wizard, in one embodiment of the invention, is flexible to support multiple types of UDRP filings which can include: 1) typosquatting and/or trademark infringements; 2) alias arguments; 3) multiple trademarks across a single trademark owner.

The software wizard can allow the inclusion of data supporting a case of trademark infringement in addition to the case of typosquatting discussed above by automatically inserting pre-loaded case precedents/decisions supporting the customer's claims of infringement. This data can be inserted by the wizard based upon user responses to questions embedded within the wizard's UDRP survey. Including this data may enable computing platform 110 to support multiple types of infringements or mark abuse employed by cybersquatters, such as traditional typosquatting (one-character permutations of a trademarked or primary domain name) and trademark infringements (typically the trademark name spelled correctly with another keyword(s) or other abuse of a brand's design, word, or service marks). The software wizard can also have the capability to support alias arguments. An alias argument is identified when a cybersquatter uses one or more false identities to register a typo or trademark infringing domain name. The cybersquatter, leveraging false WhoIs information, seeks to disguise that they are the true owner of a domain (attempting to avoid enforcement by the rightful domain owner in the process) by providing this false information. Leveraging exhibit data (screenshots, WhoIs information, IP addresses, monetization or affiliate IDs, past infringing behavior, etc. associated with the potential cybersquatters) and past case precedent, the user of the software wizard, or the wizard itself, can decide whether to load language with supporting exhibit evidence. This can done based upon a positive response to alias survey questions contained in the software wizard.

Lastly, the software wizard may have the ability to support more than one trademark from a single trademark owner. For example, a holding/parent company such as Provide Commerce, Inc., may have many sub-trademark/"children" brands that it owns and/or manages, such as, ProFlowers, Inc., Red Envelope, Inc. Shari's Berries, Inc., Secret Spoon, Inc., etc. Oftentimes, a single cybersquatter may be identified as squatting on multiple typos across several trademark brands of a parent/holding company. The software wizard may have the capability to support UDRP complaints/filings across multiple trademarks by the inclusion by user of the registration/serial number of the trademark brand(s) in question. The ability of the software wizard to support this functionality may enable a parent company (Provide Commerce in the above example) to, via a single or reduced number of UDRP filings, enforce its trademark rights in some or all of its brands (ProFlowers, Red Envelope, Secret Spoon, etc.) to recover multiple typo or trademark infringing domains (proflours.com, sherrisberries.com, secreetspoon.com, proflowersdiscounts.com). A skilled artisan will appreciated that the efficiencies borne out of the capabilities described above enables the inclusion of several domains in a single UDRP filing, thus resulting in quicker and cheaper method of combating cybersquatting.

Computing platform 110 may also generate cease and desist letters to send to the one or more potential cybersquatters prior to filing UDRP actions. Such letters may, in some cases, allow a cybersquatted domain to be recovered without the need to file a UDRP action, and thus at a lower cost.

Figure 11:
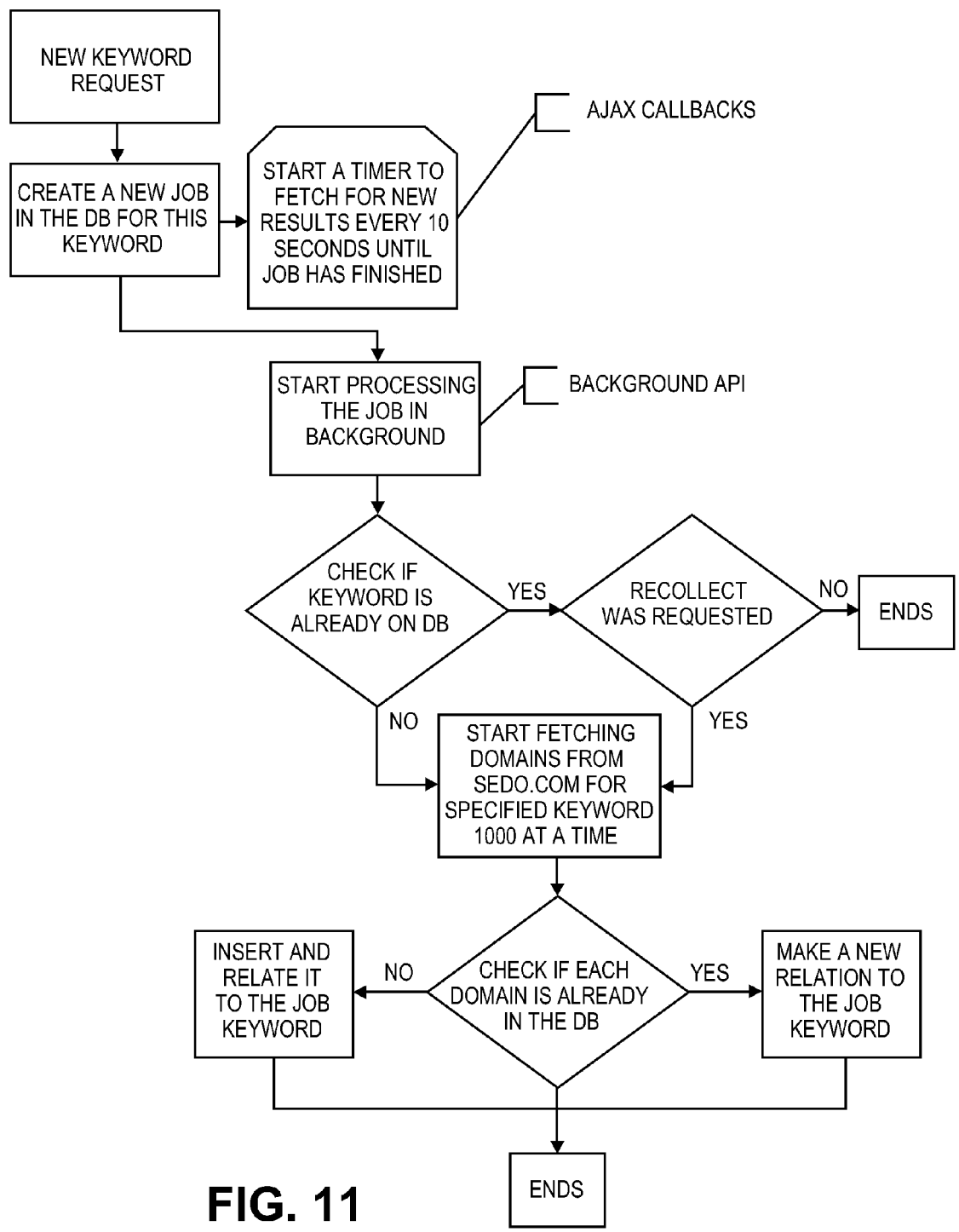
FIG. 11 illustrates an exemplary sequence of steps that may be performed by the trademark and brand protection system of FIG. 1 to purchase domains, in accordance with one embodiment of the invention.

Computing platform 110 may also build or retrieve a list of domains being auctioned by various auction houses (e.g., by crawling associated auction sites), and determine whether any of the identified (potential cybersquatted) domains are on this list. Where a match is found, the platform may alert a user (either the customer or the provider of the platform 110) that a cybersquatted domain is available for purchase. In these scenarios, the domain can sometimes be purchased for less than the cost of filing a UDRP action. For example, computing platform 110 could review the online listing of domains being auctioned by auction houses such as, GoDaddy.com, Sedo.com, Afternic.com, etc. If any of the domains being auctioned match the one or more potential cybersquatted domains, then those domains could be bidded on or purchased at the auctions and this could allow the recovery of the cybersquatted domains at a lower cost. FIG. 11 illustrates a sequence of steps that may be performed by the computing platform 110, in accordance with this embodiment of the invention.

Returning to FIG. 3, computing platform 110 then receives a notification that at least one domain from the one or more potential cybersquatted domains has been recovered (Step 370). After the UDRP documents have been submitted to the National Arbitration Forum (NAF), World Intellectual Property Organization (WIPO), or like domain dispute resolution bodies using traditional methods that are well known in the art (e.g., postal mail, email, fax, etc.), NAF or WIPO returns a decision on the UDRP filing. If the decision is favorable, then the cybersquatted domains are transferred to the complainant of the UDRP filing. For example, the cybersquatted domains may be transferred to the customer, customer's representative, etc. Alternatively, at least one of the cybersquatted domains could be recovered in response to any cease and desist letters that may have been sent. In a preferred embodiment, the recovered domains are transferred to the customer's representative, and computing platform 110 receives an indication from customer's representative via input module 120 that at least one of the domains from the one or more potential cybersquatted domains has been transferred. Computing platform 110 may then store the indication in customer database 140.

Computing platform 110 then refers traffic (or configures another system to refer traffic) for a fee (Step 380). That is, the recovered domains are included in affiliate sites 235. In a preferred embodiment, the customer's representative who maintains TMBP system 100 recovers the cybersquatted domains on behalf of the customer and becomes an affiliate of the customer. The recovered domains are given an affiliate link or ID by the customer and then the customer's representative receives fees as discussed above. Customer's representative establishes an affiliate web site on TMBP system 100 or a separate system, and whenever a fee-worthy activity occurs based on the affiliate agreement with the customer, computing platform 110 refers traffic to affiliate network 230 in exchange for a fee. In another embodiment, computing platform 110 may refer traffic directly to TMBP system user 210 for a fee. As an example of the above, first the domains may be transferred to customer's representative where they are hosted at a registrar of the customer representative's choosing. Once the domains are transferred to the registrar, the customer's representative may manually edit the WhoIs information for the recovered domains to reflect the customer as the owner of the domain but customer's representative as the administrative, technical, and billing contact for the domains. At this time, customer's representative may also change the DNS record to reflect TMBP system 100 so that proper redirection occurs (e.g. when a user types in the typo domain into the URL bar of a browser, the browser is redirected to the TMBP system 100 where the domain is hosted.)

More specifically, pending recovery the one or more potential cybersquatted domains, customer's representative may have the domains transferred to the registrar of its choice for hosting. Once transferred, the domains' DNS information can be adjusted to reflect customer representative's name servers. Additionally, upon recovery of the one or more potential cybersquatted domains, the WhoIs information on the recovered domains can changed to reflect customer-approved registrant, administrative, technical, and billing contact information. Concurrent with the changes in DNS information, customer database 140 may be updated to reflect that the recovered domains have been recovered and a new redirect URL for each recovered domain may be added. The redirect URL is a customer-approved HTTP hyperlink where traffic that was destined for the typo or trademark infringing domain is ultimately forwarded. Each redirect URL is appended with a unique identifier to enable customer's representative, customer, and/or monetization network tracking and reporting. This unique Identifier can be associated to customer's representative once the customer's representative applies to and is accepted into the chosen monetizing network(s) of the customer. The unique identifier, amongst other data, contains information related to the publisher/monetizer, and hence the terms under which traffic redirected using these links is monetized.

For instance, suppose the customer's representative recovers the typo domain aeroopostale (a typo derivation of the trademarked term Aeropostale). Upon transfer of the domain by the cybersquatter to customer's representative's chosen registrar, such as, GoDaddy, Inc., the WhoIs record for the domain can be updated to reflect Aeropostale-approved data. Additionally, the DNS information for aeroopostale may be updated to reflect customer's representative's names servers. Subsequent or following the name server change to reflect customer's representative's name servers, customer database 140 may be updated to reflect that the domain has been recovered (See FIG. 4; stage classification drop down) and a new redirect URL can be added.

One example of monetization by the customer's representative could be CPA fees. Should a visitor purchase an item using a redirect link, customer's representative may be entitled to a commission on the value of the items purchased. The commission-value could be designated in the customer's representative's contract with the customer (Aeropostale). Assuming the commission value is 5% and a visitor who uses a redirect link with a customer's representative's ID purchases a garment at Aeropostale for $100, customer's representative would be entitled to a commission fee of $5 for that transaction (5% commission multiplied by $100 shopping cart value). The customer, Aeropostale, is responsible for all commission payments due. Because of the association with the monetization network, the customer can first pay the monetization network all commission fees due (including the monetization networks service fees). The monetization network then can pay the customer's representative fees owed once all payments have been received from the customer. For those customers who do not have a monetization network affiliation, payment from the customer can occur directly.

Yet another way customer's representative can monetize domains is via a CPC relationships. This example mirrors the CPA monetization process detailed above with the core difference that as opposed to a commission value designated and ultimately a commission amount determined by multiplying the commission value and shopping cart value, a cost per click is derived. For example, the customer's representative may generate a per click fee for all traffic redirected through a recovered domain. For example, if a designated CPC fee is $1.00 and customer's representative redirects 2,000 monthly visitors from a recovered domain (aeroopostale.com) to a landing page designated by the customer, the customer's representative would be entitled to $2,000 in CPC payment for traffic redirected.

Moreover, during the recovery process and periodically during the contract term with the customer, the customer can be given the ability to view detailed documents or access a web portal to view status of the domain recovery efforts, domain level detail on recovered/unrecovered domains, and aggregate reporting metrics ("Customer Reporting"). Data derived and used in Customer Reporting is extracted from customer database 140 and at the highest level can contain data expressed in FIG. 4. This data may include the typo or trademark domain identified for potential recovery, the IP address where the domain is hosted, WhoIs information on the targeted domain, screenshot image and "transcript" data archive (inclusive of time/date stamp of when screenshot/transcript were procured), current UDRP and/or internal case number, type of infringement occurring on the domain, severity level of the infringement, and status of the recovery efforts. In addition, Customer Reporting metrics can be supplemented with third-party monetization network data, inclusive of (but not limited to) traffic redirected, conversion rate(s), revenue and commissions/CPC fees generated by campaign(s) in the aggregate (at the account and/or trademark level) and/or at the domain level.

For example, computing platform 110 may first provide a webpage to a first user ("accessor") for accessing a customer reporting portal using specified log-in credentials and then receive the log-in credentials from the first user. Subsequently, computing platform 110 can generate a list of one or more typo or trademark infringing domains associated with the account/accessor and/or trademarks associated with the accessor and populate each trademark infringing domain with domain-level detail on the domain including, such as but not limited to, the IP address where the domain is hosted, WhoIs information on the domain, screenshot image and "transcript" data archive (inclusive of time/date stamp of when screenshot/transcript were procured), typo score, traffic to the domain (if known), whether the domain is currently available at auction, current UDRP and/or internal case number, type of infringement occurring on the domain, severity level of the infringement, and status of the recovery efforts, etc. Computing platform 110 can also programmatically preparing sortable fields to sort domains by one or more of the above defined characteristics and programmatically provide access to third-party monetization network data inclusive of (but not limited to) domain-level and aggregate trademark and/or account level data on traffic redirected, conversion rate(s), revenue, and commissions/CPC fees generated by campaign(s). A skilled artisan would appreciate that computing platform 110 can also programmatically provide a download or export function whereby the accessor can download/export reporting data at the domain-level, trademark and/or account level into .XLS, .CSV, .PDF, .TXT, and other specified file formats. Moreover, computing platform 110 may populate the webpage or download/export document with additional information whereby the additional information is one or more of the following a) a copy of the UDRP filing associated with a domain(s); 2) Copies of UDRP Decisions for a domain(s); 3) Copies of all correspondence between cybersquatter and customer's representative in context of domain recovery; 4) Copies of customer/accessor contract with customer's representative; 3) copies of customer/accessor authorization letter(s) authorizing customer's representative to recover domains on its behalf; 4) copies of cease and desist letters associated with one or more of customer's/accessor's trademarks, etc.

Figure 7:
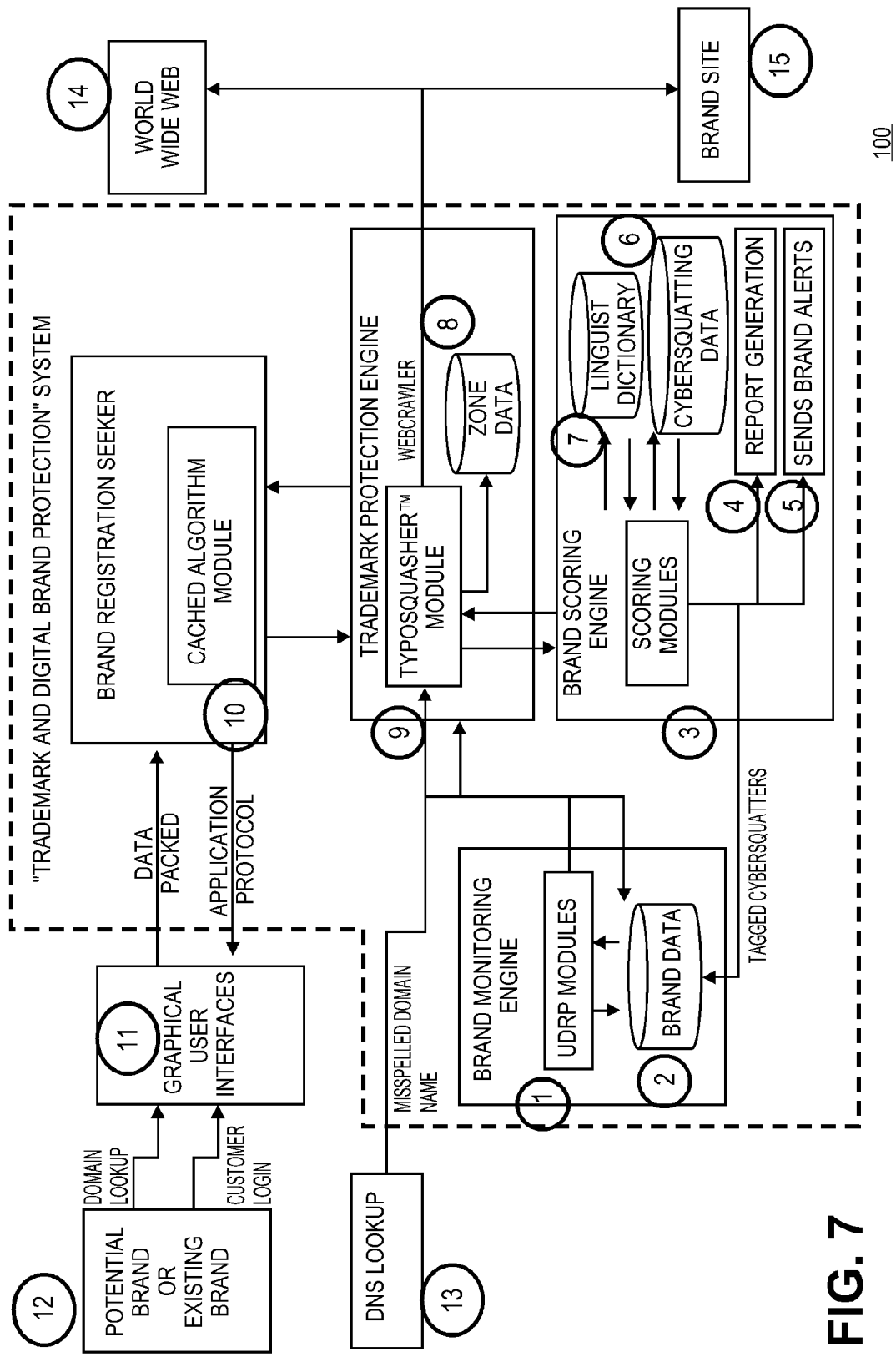
FIG. 7 illustrates more detailed components of a system for combating cybersquatting, in accordance with one embodiment of the invention.

FIG. 7 shows an exemplary software architecture for one embodiment of the present invention. Graphical User Interfaces 11 provides access to TMBP system 100. Customers (e.g., Potential Brand or Existing Brand 12) of TMBP system 100 can request cybersquatting services and view reports as discussed above via Graphical User Interfaces 11. After a customer associated with brand site 15 requests cybersquatting services, TypoSquasher Module 9 using DNS lookup 13 locates all the typo domains, as discussed above. TypoSquasher Module 11 crawls the World Wide Web 14 to locate typo domains. TypoSquasher Module 11 also collects data (e.g., screenshots) on the potential cybersquatted domains and stores them in Zone Data 8.

Next, the potential cybersquatted domains are analyzed, as discussed above, by the Scoring Modules 3. Scoring Modules uses the Linguist Dictionary 7 and the resulting Cybersquatting data 6, as also discussed above, to analyze the potential cybersquatters. After analyzing the potential cybersquatters, Report Generation Module 4 generates reports as discussed above. Also Sends Brand Alerts Module 5 can generate any alerts, as also discussed above.

Figure 10A:
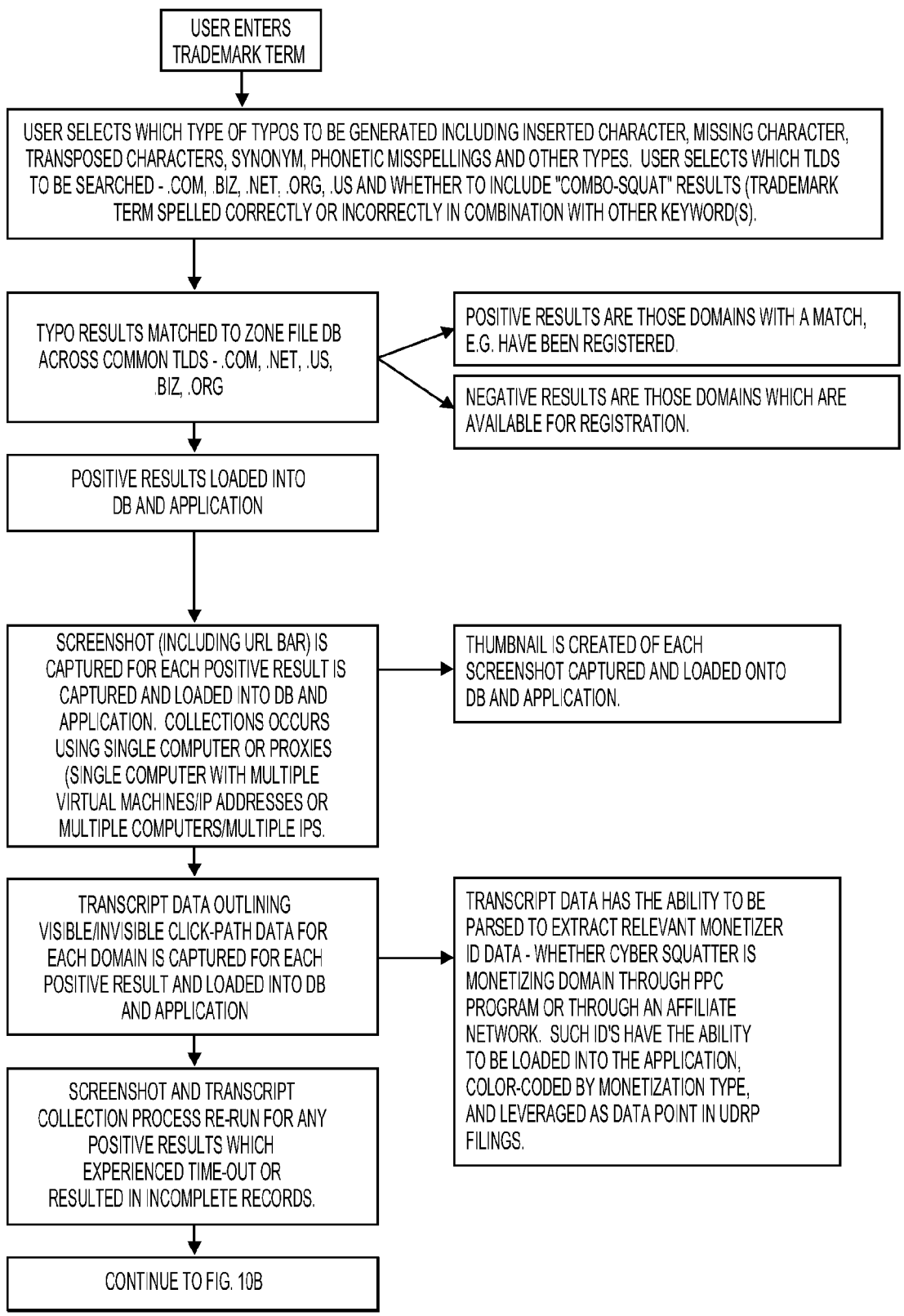
FIG. 10 illustrates another sequence of steps that that may be performed by the trademark and brand protection system of FIG. 1, in accordance with one embodiment of the invention.
Figure 10B:
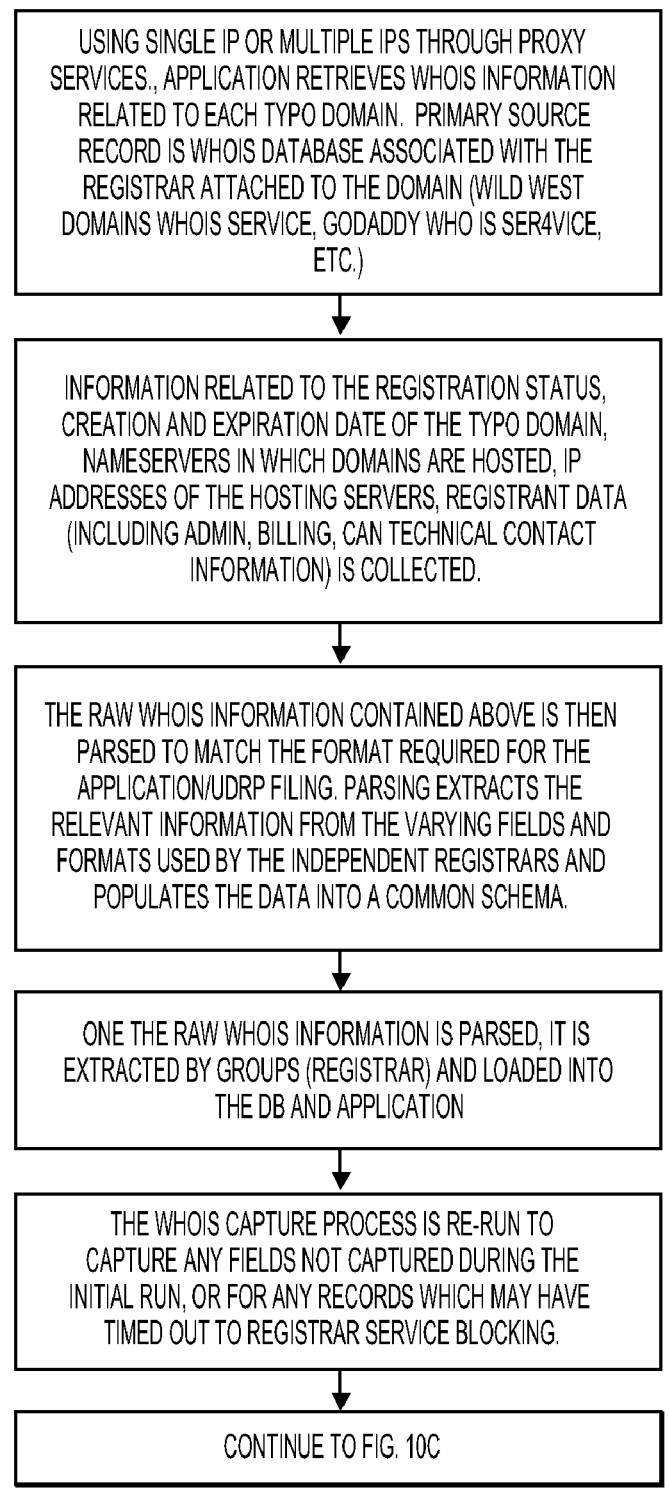
Figure 10C:
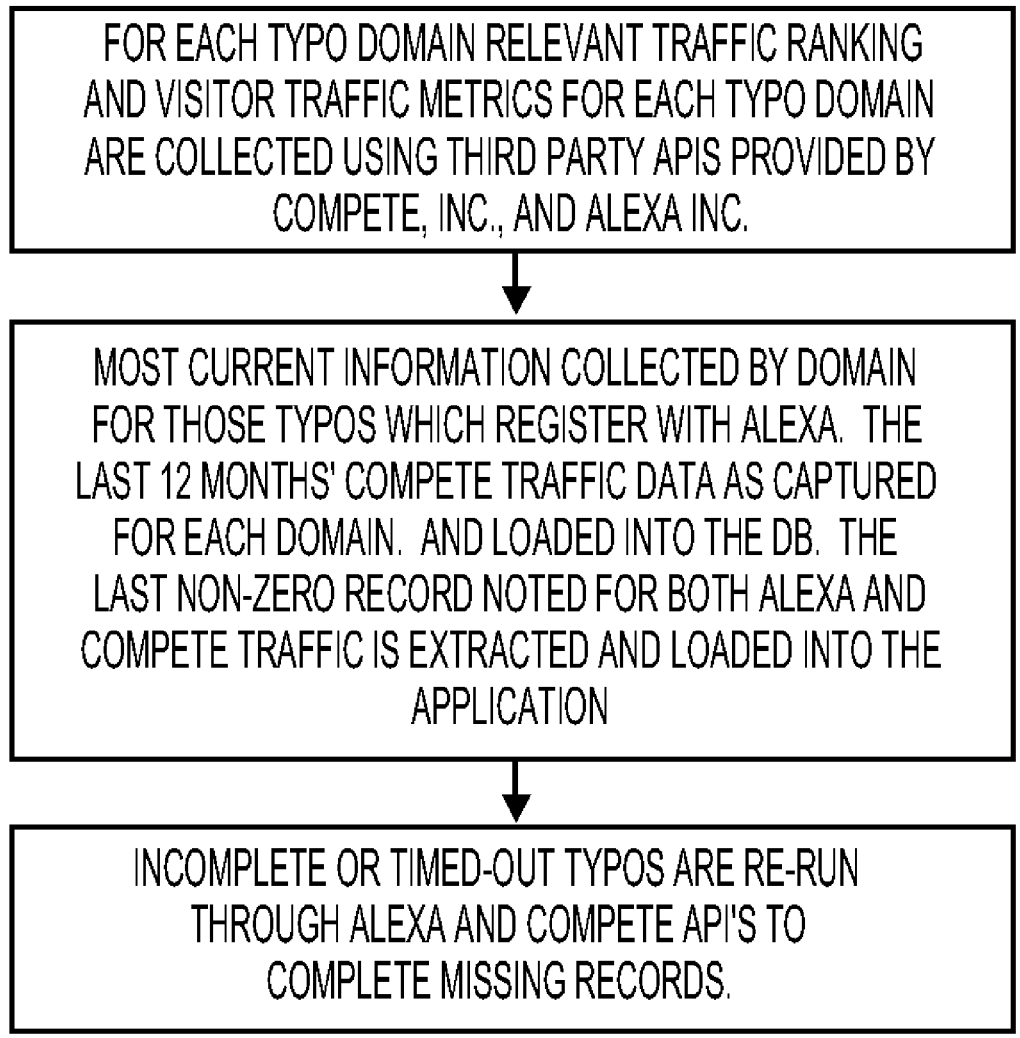

Then, UDRP Modules 1 can generate any cease and desist letters or UDRP filings as discussed above using data located in brand data 2. Further, cached algorithm module 10 allows a customer to view a list of potential cybersquatted domains before registering a brand associated with the customer. This allows customers to check if any cybersquatted domains have already been registered by another entity or allow the customer to register any cybersquatted domains along with registering their brand. FIG. 10 illustrates an exemplary sequence of steps that may be performed by this exemplary architecture or any other architecture in embodiments of the present invention.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potential representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

The disclosed features may be implemented in various environments, including computer-based environments, such as personal computers, workstations, servers, laptops, personal digital assistants (PDAs), mobile phones, handheld devices, and other computing devices, workstation, networked and other computing-based environments with one or more customers. The present invention, however, is not limited to such examples and embodiments of the invention may be implemented with other platforms and in other environments.

All of the methods and tasks described herein, and particularly those identified as performed by the computing platform 110, may be performed and fully automated by a computer system. The computer system may, in some cases, include multiple distinct computers or computing devices (e.g., physical servers, workstations, storage arrays, etc,) that communicate and interoperate over a network to perform the described functions. Each such computing device typically includes a processor (or multiple processors) that executes program instructions stored in a memory or other computer-readable storage medium. Where the system includes multiple computing devices, these devices may, but need not, be co-located. The results of the disclosed methods and tasks may be persistently stored by transforming physical storage devices, such as solid state memory chips and/or magnetic disks, into a different state. Although the various functions described herein are preferably embodied in software executed by the computer system, some of all of these functions may alternatively be implemented in application-specific hardware that is specifically designed to perform such functions.

It should be emphasized that many variations and modifications may be made to the above-described embodiments, the elements of which are to be understood as being among other acceptable examples. All such modifications and variations are intended to be included herein within the scope of this disclosure.

What is claimed is:

1. A computer-implemented method for combating cybersquatting, comprising:
    providing a webpage for a user to submit a trademark to be monitored for potential typosquatting;
    receiving the submitted trademark;
    generating a list of typo domains for the submitted trademark;
    collecting data associated with the typo domains;
    traversing HTTP links from respective typo domains until a respective final destination domain associated with the typo domains is reached;
    determining a monetization ID for the respective typo domains by analyzing the traversed HTTP requests;
    grouping the typo domains based at least in part on predetermined criteria for inclusion in a document submission, wherein the predetermined criteria comprises the monetization ID associated with the typo domains;
    programmatically preparing a document for the document submission, wherein the document includes the grouped domains with their associated collected data;
    programmatically providing a graphical user interface for automatically populating the document submission with additional information based at least on one or more inputs received from a second user, wherein the additional information comprises at least one of (a) a document attachment providing evidence supporting cybersquatting of the submitted trademark and (b) a legal argument supporting cybersquatting of the trademark;
    receiving the one or more inputs from the second user; and
    automatically populating the document submission with the additional information for submission to an administrative body;
    wherein the method is performed by a computing system comprising one or more computing devices.

2. The method of claim 1, wherein the collected data includes screenshots of the domains.

3. The method of claim 1, wherein at least one of the typo domains is based on a typo of the submitted trademark that comprises at least one of missing character, double character, transposed character, phonetic misspelling, and mirror image character.

4. The method of claim 1, wherein the collected data includes a monetization ID associated with the typo domains.

5. The method of claim 1, wherein preparing the document comprises preparing cease and desist letters for submission to owners of the typo domains.

6. The method of claim 1, wherein preparing the document comprises preparing the document for submission to an administrative agency.

7. The method of claim 6, further comprising receiving a notification from the administrative agency that one or more of the domains included in the document has been recovered.

8. The method of claim 6, wherein the document is a Uniform Domain Name Resolution Policy document.

9. The method of claim 7, wherein at least one of the recovered domains refers traffic to the owner of the submitted trademark for a fee.

10. A computing system comprising:
    one or more processors;
    tangible, non-transitory computer storage that stores a program that when executed by the one or more processors is configured to perform operations, comprising:
    providing an electronic form for a user to submit a trademark to be monitored for potential typosquatting;
    receiving the submitted trademark;
    generating a list of typo domains for the submitted trademark;
    collecting data associated with the typo domains;
    traversing HTTP links from respective typo domains until a respective final destination domain associated with the typo domains is reached;
    determining a monetization ID for the respective typo domains by analyzing the traversed HTTP requests;
    grouping the typo domains based at least in part on predetermined criteria for inclusion in a document submission, wherein the predetermined criteria comprises the monetization ID associated with the typo domains;
    programmatically preparing a document for the document submission, wherein the document includes the grouped domains with their associated collected data;
    programmatically providing a graphical user interface for automatically populating the document submission with additional information based at least on one or more inputs received from the second user, wherein the additional information comprises at least one of (a) a document attachment providing evidence supporting cybersquatting of the submitted trademark and (b) a legal argument supporting cybersquatting of the trademark;
    receiving the one or more inputs from the second user; and
    automatically populating the document submission with the additional information for submission to an administrative body.

11. The computing system of claim 10, wherein the collected data includes screenshots of the domains.

12. The computing system of claim 10, wherein at least one of the typo domains is based on a typo of the submitted trademark that comprises at least one of missing character, double character, transposed character, phonetic misspelling, and mirror image character.

13. The computing system of claim 10, wherein the collected data includes a monetization ID associated with the typo domains.

14. The computing system of claim 10, wherein preparing the document comprises preparing cease and desist letters for submission to owners of the typo domains.

15. The computing system of claim 10, wherein preparing the document comprises preparing the document for submission to an administrative agency.

16. The computing system of claim 15, further comprising receiving a notification from the administrative agency that one or more of the domains included in the document has been recovered.

17. The computing system of claim 16, wherein at least one of the recovered domains refers traffic to the owner of the submitted trademark for a fee.

18. The computing system of claim 15, wherein the document is a Uniform Domain Name Resolution Policy document.

* * * * *